US008326705B2

(12) United States Patent
Niessen et al.

(10) Patent No.: US 8,326,705 B2
(45) Date of Patent: Dec. 4, 2012

(54) RESTAURANT YIELD MANAGEMENT PORTAL

(75) Inventors: Peter William Niessen, New York, NY (US); Aileen Kheraj, Jersey City, NJ (US); Jack Funda, Summit, NJ (US); Sheraz Shere, Brooklyn, NY (US); Rebecca Fogg, Brooklyn, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 953 days.

(21) Appl. No.: 11/644,018

(22) Filed: Dec. 22, 2006

(65) Prior Publication Data

US 2008/0154654 A1 Jun. 26, 2008

(51) Int. Cl.
*G06Q 10/00* (2012.01)

(52) U.S. Cl. .......... 705/28; 705/5; 705/14.1; 705/14.34; 705/14.49; 705/14.61; 705/14.66; 705/15; 705/26.7; 705/35

(58) Field of Classification Search .................. 705/5, 35
See application file for complete search history.

(56) References Cited

U.S. PATENT DOCUMENTS

| | | | | |
|---|---|---|---|---|
| 6,741,969 | B1 * | 5/2004 | Chen et al. ....................... | 705/14 |
| 7,069,228 | B1 * | 6/2006 | Rose et al. ........................ | 705/5 |
| 2002/0161640 | A1 * | 10/2002 | Wolfe ............................. | 705/14 |
| 2003/0088692 | A1 * | 5/2003 | Badovinatz et al. ........... | 709/237 |
| 2006/0242039 | A1 | 10/2006 | Haggerty et al. | |
| 2007/0226080 | A1 * | 9/2007 | Chessick ......................... | 705/27 |

OTHER PUBLICATIONS

Diners Club FAQ for Personal Cardmembers, May 16, 2005 (http://web.archive.org/web/20050516090451/http://www.dinersclubus.com/dce_content/clubrewardsandbenefits/faqs/personal).*
Diners Club Homepage, May 6, 2005 (http://web.archive.org/web/20050506173845/www.dinersclubus.com/dce_content/home).*
Diners Club FAQ for Merchants (http://web.archive.org/web/20050519042615/www.dinersclubus.com/dce_content/merchants/faqs).*
"CEO Interview: Kenneth Posner—Rewards Network Inc (IRN)," The Wall Street Transcript Corporation, Wall Street Transcript, (May 16, 2005), p. 1.*
"DinnerBroker—Your Connection to the World's Best Restaurants", http://www.dinnerbroker.com/about_us/, 2000-2006 DinnerBroker, Inc., last modified: May 26, 2006, 1 page.
"Rewards Network", http://www.rewardsnetwork.com/company.jsp, 2006 Rewards Network Inc., last modified: May 18, 2006, 1 page.
"OpenTable.com", http://www.opentable.com/info/aboutus.aspx, 1999-2006 OpenTable.com, last modified: Apr. 26, 2006, 1 page.

* cited by examiner

*Primary Examiner* — Elizabeth Rosen
(74) *Attorney, Agent, or Firm* — Snell & Wilmer L.L.P.

(57) ABSTRACT

A system and method to optimize the yield of a restaurant having perishable inventory is described. Through a card company, a restaurant can market incentives to make reservations during an off-peak time to enrolled card members. Offer marketing is based on stated customer preferences, and conducted via, for example, a website, email, or text message. Reservations are made, for example, via a centralized booking service. The incentive is fulfilled to the card member in a coupon-less manner. The card company receives a commission from the participating restaurant for every such sale.

18 Claims, 22 Drawing Sheets

| Customer Identification Number | Transaction Amount | Incentive Value to CM 1306 | Commission | Merchant Debit Amount | Date | Merchant 102 | Offer ID |
|---|---|---|---|---|---|---|---|
| 123 | $380.00 | $76.00 | $38.00 | $114.00 | XX/XX/XXXX | 123456789 A | 232 |
| 687 | $355.00 | $71.00 | $35.50 | $106.50 | YY/YY/YYYY | 012301239 B | 456 |

Output File 1900

FIG. 19

An example Daily Digest

Daily Digest for Mr. XXXX YYYYY, mm/dd/yy

- <u>Thursday, June 22</u>
- Ama – exclusive reservations!
- Pepolino – exclusive reservations!
- Lo Scalco – up to 10% off
- Fiamma Osteria – up to 20% off
- Carmines – up to 20% off
- Acapella – up to 30% off

FIG. 20A

An example "Flash" Alert

Dear John Smith, the following offer is available to you:

Thursday, June 22 – 20% off @ Tribeca Grill, 8 pm

Respond "RESERVE" to make a reservation.

FIG. 20B

RESTAURANT YIELD MANAGEMENT PORTAL

BACKGROUND OF THE INVENTION

1. Field of the Invention

The present invention relates to targeted consumer marketing for optimizing the yield of perishable inventory.

2. Background Art

Many industries, such as restaurants, hotels, and theatres have fixed capacity and uneven demand patterns. In the periods where the demand is below the capacity, the merchant has excess inventory that perishes quickly. The perishable inventory may include unused tables at a restaurant, unoccupied rooms at a hotel, or empty seats at a theatre. If not utilized, this inventory will produce zero returns. Merchants in the past have tried to solve this problem by offering broad-based discounts to spur demand during low-demand periods. For example, some retail merchants have off-season discount sales. As another example, some airline providers sells unsold seats at a discount over the Internet. This broad-based approach, however, results in a low success rate, because the ratio of number of offers to number of acceptances is high. Further, notification of these broad-based discounts is usually only available to existing customers of a merchant or individuals geographically located near the merchant.

Several reservation platforms exist, such as OpenTable.com, run by Open Table, Inc. of San Francisco, Calif.; RewardsNetwork.com, run by Rewards Network, Inc. of Chicago, Ill.; and DinnerBroker.com, run by DinnerBroker, Inc. of San Francisco, Calif.

OpenTable.com is a supplier of reservation, table management and guest management software for restaurants. The OpenTable.com reservation system receives, on a daily basis, information about available inventory from merchants. A merchant connects with the OpenTable.com reservation platform and provides details of open and booked tables throughout the day. An associated electronic reservation book is used by the restaurant to continually manage all its reservations, not only reservations made online. Because this electronic reservation book is connected to the OpenTable.com reservation platform, a database of inventory that is being marketed by the reservation platform is dynamically updated. This is referred to herein as dynamic inventory. Therefore, when the electronic reservation book changes at a particular location, OpenTable.com servers quickly obtain that information and provide it to their customers. OpenTable.com has a loyalty program to incent users, where a user receives a certain number of rewards points for a given reservation. The rewards points can later be redeemed, for example, for gift certificates valid at various restaurants. However, OpenTable.com does not actively market the inventory to its users based on any user preferences. Instead, a user is limited to searching for a restaurant by oneself.

RewardsNetwork.com focuses on the couponless fulfillment of incentives using cash and rewards points. Over the telephone, merchants allocate a specific set of tables to RewardsNetwork.com, and this allocation does not change on a daily or weekly basis. That is, their availability is not dynamic, and merchants cannot respond to short term fluctuations in inventory that cannot be predicted ahead of time. RewardsNetwork.com can provide couponless fulfillment of its discounts through a credit on a member's credit card statement, after the user pays full price at the time of purchase. Alternatively, the value of the discount can be converted into rewards points and deposited into a specified rewards account (airline or otherwise) associated with the user. Like OpenTable.com, RewardsNetwork.com does not actively market the inventory to its users based on any user preferences.

DinnerBroker.com has a website on which offers are presented to users. Merchants can make available different offers for different times of day on different days of the week. The slate of offers changes periodically, such as once a day or once a week. A user contacts the restaurant to make a reservation, and then prints out a coupon to be redeemed at the point of sale. The incentive is a cash incentive, because it provides a discount at a point of sale. DinnerBroker.com does not actively market the inventory to its users based on any user preferences.

In addition to the lack of marketing of inventory to customers based on customer preferences, these systems also do not provide, in a single integrated environment, any couponless financial incentive, dynamic inventory offers and loyalty points to customers willing to consume goods at low periods of demand, which for the case of restaurants would be the off-peak hours. They also do not send out offers based on consumer differentiation on the basis of how active a consumer is in using the system. What is needed is a system that sends out offers to targeted consumers based on consumer preferences.

BRIEF SUMMARY OF THE INVENTION

Customer preferences may be solicited to gather explicit cardmember preferences, and/or mining of consumer data, merchant data, and transaction data can be used to determine implicit CM preferences. This data may be collected using a network of merchants and customers, such as the closed loop network run by American Express Corp. of New York, N.Y. Customer demand can be predicted at the micro-segment level to establish pricing that maximizes the return on fixed investment for the merchant. The demand patterns of a merchant can also be analyzed to determine periods of excess inventory of the merchant. For low-demand periods and/or low-demand locations, selected cardholders may be offered discounts to particular merchants.

According to one embodiment of the present invention, perishable inventory is targeted to potential customers for sale during off-peak hours. Customers availing the promotional offers are credited for discounts directly via a statement credit, thereby resulting in a couponless system of rebate. Therefore, the couponless system manifests itself as a financial incentive to the customers. Since customers shop like a regular customer who is not availing any such discounts, it avoids the hassle of presenting coupons to the merchant who is providing these discounts. Through a card membership program, an associated card company can charge the merchant on a commission basis for every such sale incurred.

According to further embodiments of the invention, the marketing of discounts is customized based on cardholder shopping patterns, cardholder preferences, and/or demographics. Instead of offering broad-based discounts to everyone via direct or outbound marketing, this system and method enables merchants to instead reach consumers who, via their own search methods or their preferences, indicate potential interest. Using pricing as a lever, the cardholders with specific explicitly stated or implicitly revealed preferences are targeted to shift demand from peak periods or locations to non-peak periods or locations, and to increase the non-peak demand by location as well as time period. Merchants can thereby target offers to potential customers with the highest potential interest in their restaurants, helping them to generate incremental business at lower cost relative to broad-based promotions. Cardholders also benefit, as they have the option of buying goods and/or services that fit their preferences at a discounted price. Cardholders can also sign up as new members to avail benefits offered by various embodiments of the invention. Alternatively, card holders can also, at any point of time, opt out of any service offered by various embodiments of the invention.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 19 shows an example of an output file created as a result of various processes described in the restaurant yield management portal, according to an embodiment of the invention.

FIG. 20A shows an example of a newsletter, according to an embodiment of the invention.

FIG. 20B shows an example of a "Flash" alert, according to an embodiment of the invention.

The present invention will be described with reference to the accompanying drawings. The drawing in which an element first appears is typically indicated by the leftmost digit(s) in the corresponding reference number.

DETAILED DESCRIPTION OF THE INVENTION

I. Overview

Figure 1:
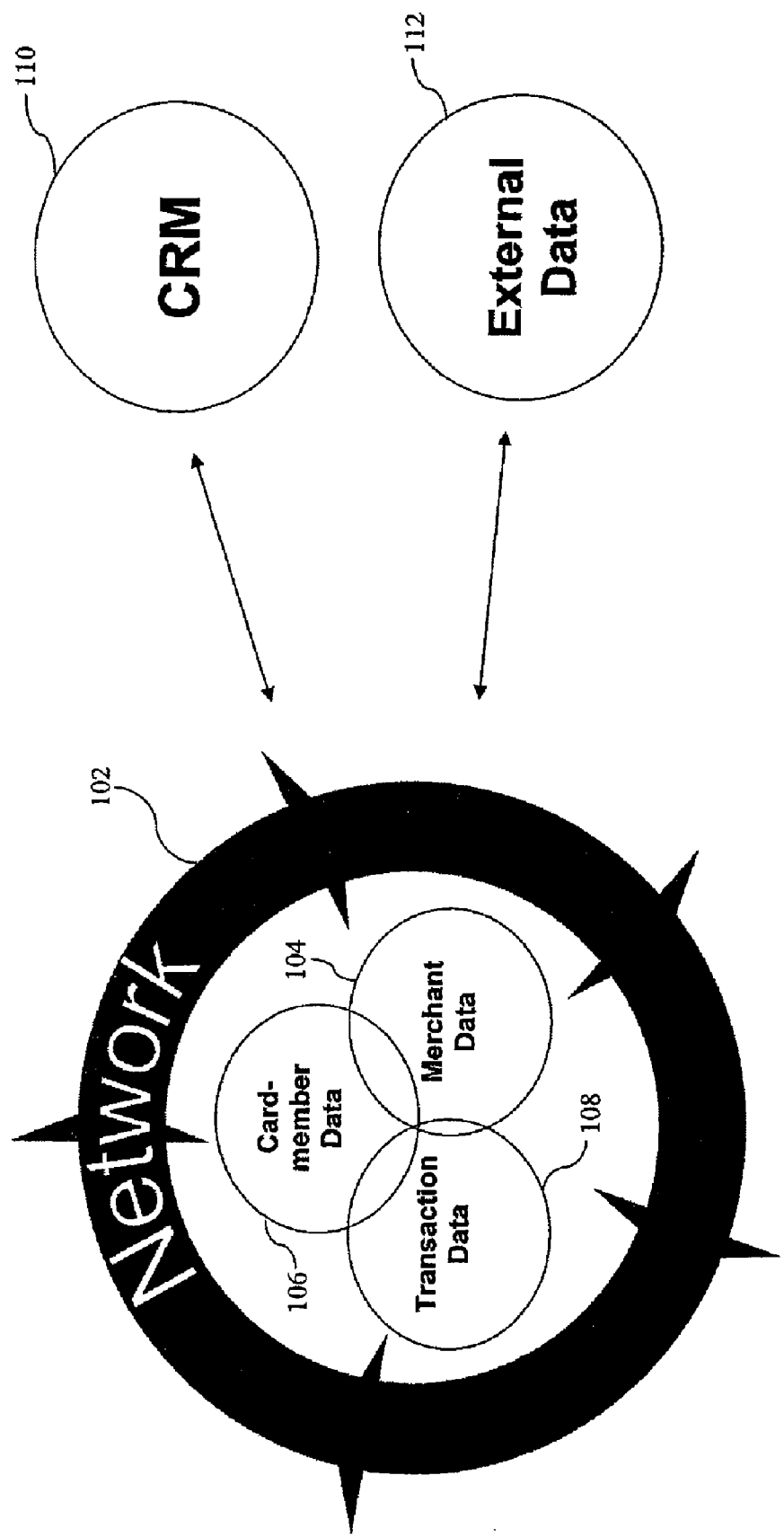
FIG. 1 is an illustration of example data sources for data mining.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

The terms "consumer," "customer," "participant," "cardmember," "cardholder" and/or the plural form of these terms are used interchangeably throughout herein to refer to those persons or entities capable of accessing, using, be affected by and/or benefiting from the present invention.

Furthermore, the terms "business," "service provider," or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

1. Transaction Accounts and Instrument

A "transaction account" as used herein refers to an account associated with an open account or a closed account system (as described below). The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument.

A financial transaction instrument may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or can be a fob having a transponder and/or an RFID reader.

2. Open Versus Closed Cards

"Open cards" are financial transaction cards that are generally accepted at different merchants. Examples of open cards include the American Express Visa®, MasterCard® and Discover® cards, which may be used at many different retailers and other businesses. In contrast, "closed cards" are financial transaction cards that may be restricted to use in a particular store, a particular chain of stores or a collection of affiliated stores. One example of a closed card is a pre-paid gift card that may only be purchased at, and only be accepted at, a clothing retailer, such as The Gap® store.

3. Stored Value Cards

Stored value cards are forms of transaction instruments associated with transaction accounts, wherein the stored value cards provide cash equivalent value that may be used within an existing payment/transaction infrastructure. Stored value cards are frequently referred to as gift, pre-paid or cash cards, in that money is deposited in an account associated with the card before use of the card is allowed. For example, if a customer deposits ten dollars of value into the account associated with the stored value card, the card may only be used for payments up to ten dollars.

4. Use of Transaction Accounts

With regard to use of a transaction account, users may communicate with merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit implemented in the form of a computer-server, although other implementations are possible.

In general, transaction accounts may be used for transactions between the user and merchant through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

5. Account and Merchant Numbers

An "account," "account number" or "account code", as used herein, may include any device, code, number, letter, symbol, digital certificate, smart chip, digital signal, analog signal, biometric or other identifier/indicia suitably configured to allow a consumer to access, interact with or communicate with a financial transaction system. The account number may optionally be located on or associated with any financial transaction instrument (e.g., rewards, charge, credit, debit, prepaid, telephone, embossed, smart, magnetic stripe, bar code, transponder or radio frequency card).

The account number may be distributed and stored in any form of plastic, electronic, magnetic, radio frequency (RF), wireless, audio and/or optical device capable of transmitting or downloading data from itself to a second device. A customer account number may be, for example, a sixteen-digit credit card number. Each credit card issuer has its own numbering system, such as the fifteen-digit numbering system used by American Express Company of New York, N.Y. Each issuer's credit card numbers comply with that company's standardized format such that an issuer using a sixteen-digit format will generally use four spaced sets of numbers in the form of:

$N_1N_2N_3N_4\ N_5N_7N_8\ N_9N_{10}N_{11}N_{12}\ N_{13}N_{14}N_{15}N_{16}$

The first five to seven digits are reserved for processing purposes and identify the issuing institution, card type, etc. In this example, the last (sixteenth) digit is typically used as a checksum for the sixteen-digit number. The intermediary eight-to-ten digits are used to uniquely identify the customer, card holder or cardmember.

A merchant account number may be, for example, any number or alpha-numeric characters that identifies a particular merchant for purposes of card acceptance, account reconciliation, reporting and the like.

6. RFID and Transmission of Magnetic Stripe Data

It should be noted that the transfer of information in accordance with the present invention, may be done in a format recognizable by a merchant system or account issuer. In that regard, by way of example, the information may be transmitted from an RFID device to an RFID reader, or from the RFID reader to the merchant system in magnetic stripe or multi-track magnetic stripe format.

Because of the proliferation of devices using magnetic stripe format, the standards for coding information in magnetic stripe format were standardized by the International Organization for Standardization in ISO/IEC 7811-n (characteristics for identification cards) which are incorporated herein by reference. The ISO/IEC 7811 standards specify the conditions for conformance, physical characteristics for the card (warpage and surface distortions) and the magnetic stripe area (location, height and surface profile, roughness, adhesion, wear and resistance to chemicals), the signal amplitude performance characteristics of the magnetic stripe, the encoding specification including technique (MFM), angle of recording, bit density, flux transition spacing variation and signal amplitude, the data structure including track format, use of error correction techniques, user data capacity for ID-1, ID-2 and ID-3 size cards, and decoding techniques, and the location of encoded tracks.

Typically, magnetic stripe information is formatted in three tracks. Certain industry information must be maintained on certain portion of the tracks, while other portions of the tracks may have open data fields. The contents of each track and the formatting of the information provided to each track is controlled by the ISO/IEC 7811 standard. For example, the information must typically be encoded in binary. Track 1 is usually encoded with user information (i.e., name) in alphanumeric format. Track 2 is typically comprised of discretionary and nondiscretionary data fields. In one example, the nondiscretionary field may comprise 19 characters and the discretionary field may comprise 13 characters. Track 3 is typically reserved for financial transactions and includes enciphered versions of the user's personal identification number, country code, current units amount authorized per cycle, subsidiary accounts, and restrictions.

As such, where information is provided in accordance with the present invention, it may be provided in magnetic stripe track format. For example, the counter values, authentication tags and encrypted identifiers, described herein, may be forwarded encoded in all or a portion of a data stream representing data encoded in, for example, track 2 or track 3 format.

II. Targeted Marketing

As shown in FIG. 1, several sources may be leveraged to gather information about consumers, merchants and the transactions between them. With a network 102, such as the closed loop network run by American Express Corp. of New York, N.Y., it is possible to gather merchant data 104, customer data 106, and transaction data 108 of transactions by a merchant and/or customer based on records from the network owner. In a closed loop network, merchant data 104 is known because of the relationship between the network owner, such as American Express, and many merchants. Cardholder data 106 is known because of the relationship between the network owner and many cardholders. When a cardholder enters into a transaction with a merchant, such as by swiping a transaction instrument through a card reader, information about that purchase is added to transaction data 108. Merchant data 104, customer data 106, and transaction data 108 need not be obtained from a closed loop network, but may be obtained from alternate sources, such as from corporate records, from information received directly from customers and merchants, or through purchase of the information from external sources. Customer relationship management ("CRM") data 110 and external data 112 may also be used to determine information about customers and merchants. External data 112 may include data provided by independent merchant rating services, such as, for example, the ratings provided by Zagat Survey, LLC, of New York, N.Y.

Merchant data includes, for example and without limitation, the location of the merchant, the merchant's industry, and the amount of inventory moved by the merchant at various days, times, and locations. Customer data includes, for example and without limitation, the types of services and products the customer uses, the merchants the customers usually purchase from, as well as spend habits and spend capacity of the customers.

Figure 2:
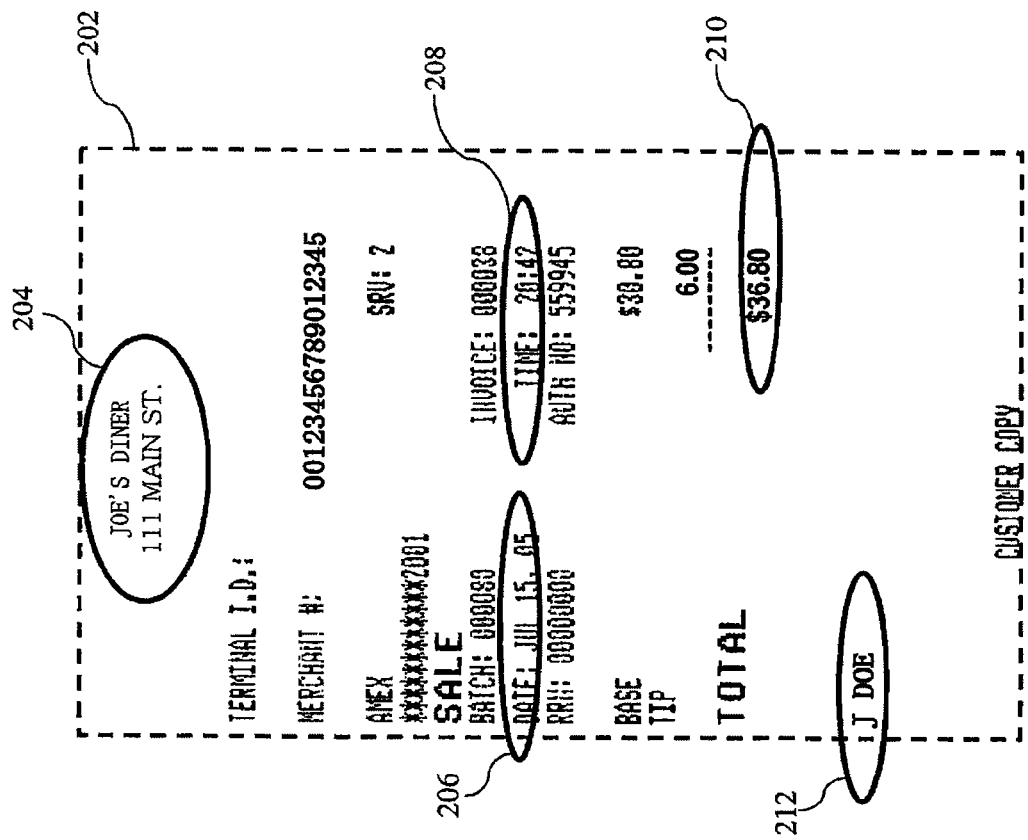
FIG. 2 is an illustration of a sample record of charge that may be used to obtain customer, merchant, and/or transaction data.

When a customer interacts with a merchant in a transaction, transaction data is produced. Simple retail purchases may result in basic transaction information, as shown in FIG. 2. FIG. 2 is an illustration of a sample receipt 202, showing the type of information that may be obtained from the simple retail purchase. Merchant name and location information 204, day of transaction 206, time of transaction 208, amount of transaction 210, and customer name 212 can all be obtained from a record of charge such as receipt 202. If the transaction is more detailed, enhanced information can also be obtained. For example, if a customer books a flight with an airline, city pairs and dates of departure and/or return may be obtained in addition to the basic transaction information. Most of the consumer transaction data comes from data collected when the customer's transaction account is used, such as, for example, when the customer uses a credit card. However, a reasonable assumption can be made that consumers paying by cash or check exhibit similar purchasing patterns as consumers paying by, for example, a credit card.

Figure 3:
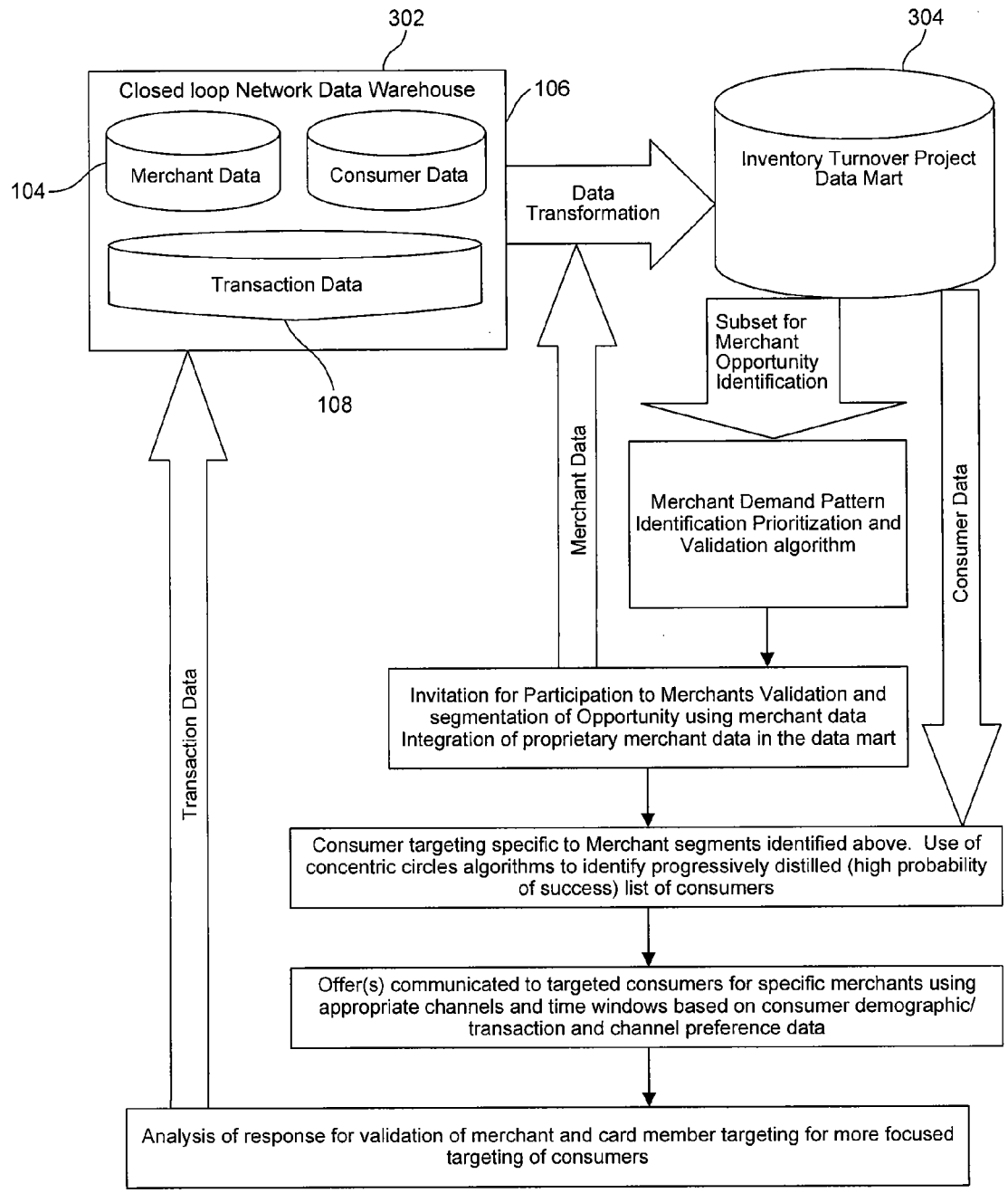
FIG. 3 is a flowchart illustrating an example method by which customers may be targeted according to an embodiment of the present invention.

All this merchant, consumer, and transaction data may be stored in a database, referred to herein as a data warehouse. Extensive data mining can be performed on the information in the data warehouse to match potential customers with merchants. FIG. 3 is a flowchart illustrating the method in which data is taken from the data warehouse and processed to produce a set of targeted customers for particular merchants. As shown in FIG. 3, data warehouse 302 stores merchant data 104, consumer data 106, and transaction data 108. Data warehouse 302 may exist, for example, on a computer usable medium.

Much of the collected data in data warehouse 302 is not useful for targeting analysis. Useful data is thus taken out of data warehouse 302 and transformed so that it is easy to analyze. This data is stored in a database specific to the application, referred to herein as a data mart. Much like a data warehouse is a collection of a wide variety of information relating to a wide variety of applications, a data mart is a smaller collection of data specific to a particular application. For example, if it is useful to identify customers who would be most likely to respond to a discount offered by a particular merchant at a low-demand period of the merchant, the data may be stored in an inventory turnover data mart 304 that contains information relevant to inventory turnover. Data mart 304 may be stored, for example, on a computer usable medium. In data mart 304, the merchant data, consumer data, and transaction data are reorganized for the specific purpose of the analysis.

Merchant information may be extracted from data mart 304. To the extent that merchant information is combined with related transaction information, merchant data and transaction data are segmented. The segmentation may be based, for example and without limitation, on time, industry, location, complementary merchants, and/or competing merchants to identify inventory turnover opportunities using a merchant demand pattern identification prioritization and validation algorithm.

An inventory turnover opportunity exists when a merchant has low demand, also referred to as excess inventory. Excess inventory occurs when the merchant has more of its product than is wanted by its consumers. Excess inventory may include extra units of a product if the merchant is a manufacturer or retailer. Excess inventory may also include empty tables at a restaurant, empty seats on an airplane, or empty rooms in a hotel. Some merchants have very little excess inventory, and thus may not need to target customers for discounted business. In some cases, it may be desired to target existing customers to shift demand from peak periods and locations to non-peak period and locations, such as when the demand for a good or service is greater than the inventory at a particular time or location. In other cases, it may be desired to target potential customers to add to the non-peak demand for a location or time period. Although restaurants will be used as an example herein, one of skill in the pertinent art(s) will recognize that the process applies in a similar manner to any merchant of goods and services, such as and without limitation, a manufacturer, an airline company, a retailer, an entertainment company such as a theatre or cineplex, and a hotel company.

Figure 4A:
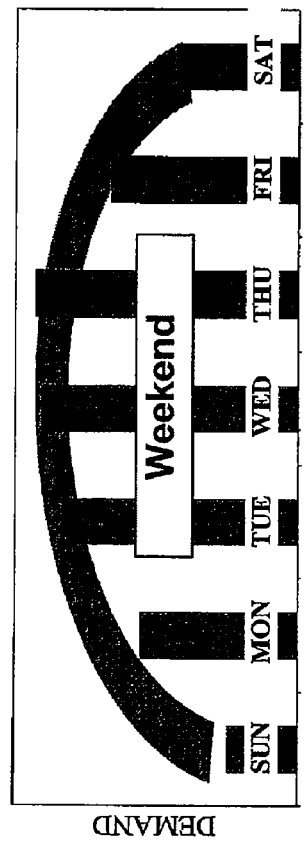
FIGS. 4A-4D are charts illustrating demand for example individual restaurants on a per-day basis.

In the restaurant example, certain high-end restaurants may be in such high demand that they do not suffer from a lack of reservations during specific times. FIG. 4A is a chart showing the demand for an example high-demand Restaurant #1. As shown, the demand for Restaurant #1 is fairly even, and there are no real periods of low demand. Other merchants may have periods of low demand and could benefit by offering discounts to customers willing to purchase their products or services during those low demand periods. These merchants may be identified using a merchant demand pattern algorithm. Such an algorithm analyzes the merchant data to determine, for example, the dates and times that the merchant posts the most and/or least revenue. The algorithm may also compare similar establishments with a similar customer base and/or similar locations to identify demand patterns.

Figure 4B:
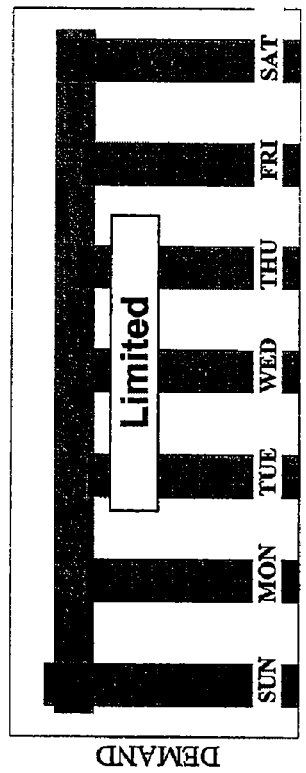
Figure 4C:
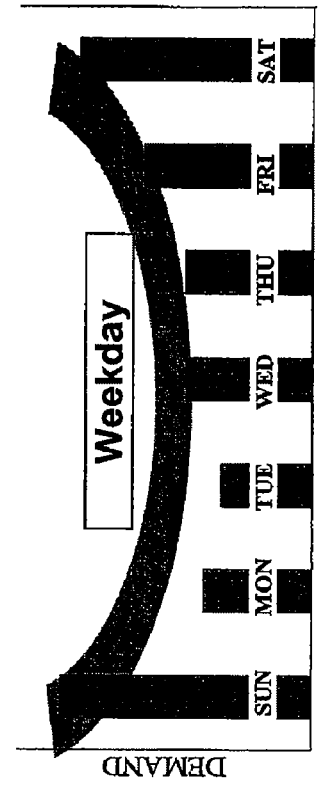
Figure 4D:
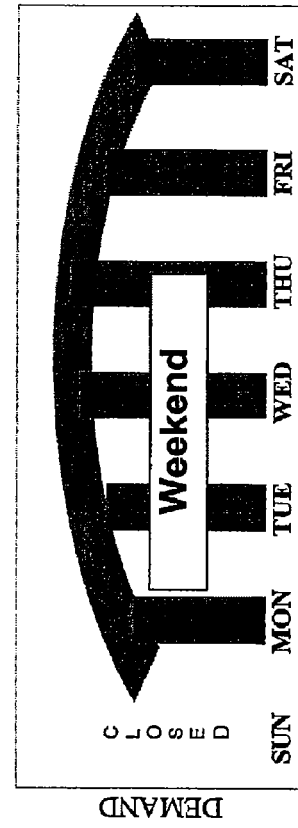

Following the restaurant example, other restaurants may experience low demand periods on certain days of the week. FIGS. 4B and 4C are charts showing the demand per day for sample Restaurant #2 and sample Restaurant #3, respectively. As shown, Restaurant #2 and Restaurant #3 experience high demand in the middle of the week. However, Restaurant #2 experiences periods of low demand on Saturdays and Sundays. Similarly, Restaurant #3 experiences periods of low demand on Saturdays and Mondays, as it is closed on Sundays. Restaurant #2 and Restaurant #3 are thus identified as merchants having an opportunity to benefit from an inventory turnover program on weekends. FIG. 4D is a chart showing demand per day of another sample Restaurant #4, which has high demand on the weekends, but low demand on weekdays. Restaurant #4 is thus identified as a merchant having an opportunity to benefit from inventory turnover assistance on weekdays.

Figure 5A:
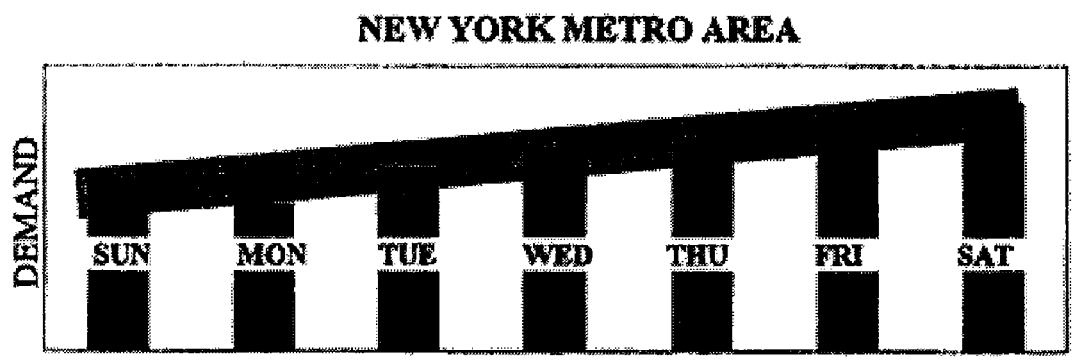
FIGS. 5A-5C are charts illustrating demand for restaurants across example geographic areas on a per-day basis.
Figure 5B:
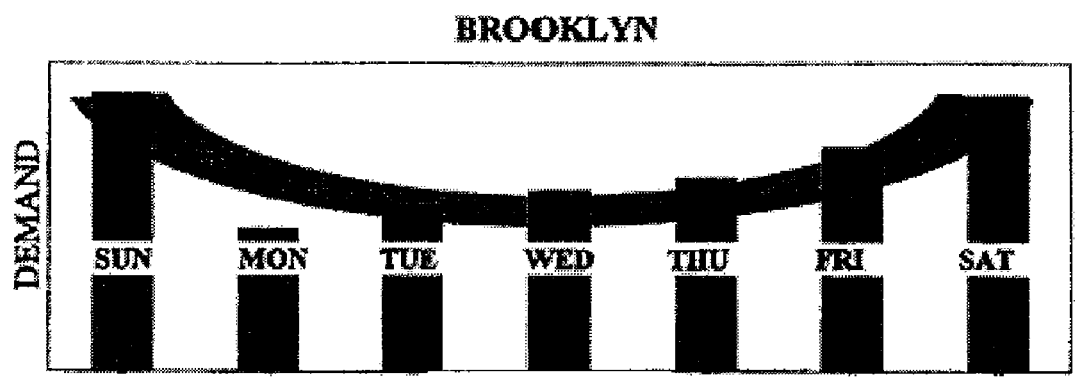
Figure 5C:
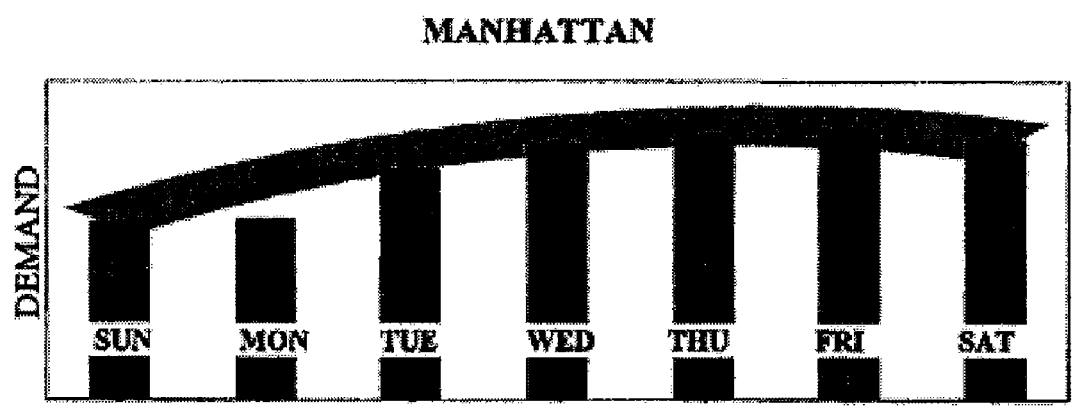

Low-demand periods may also vary by geography. For example, as shown in FIG. 5A, restaurants in the New York City metro area may generally experience a low-demand period on Mondays. When the geographical location is narrowed down to Brooklyn, restaurants may generally experience a low-demand period during weekdays, as shown in FIG. 5B. When the geographical location is narrowed down to Manhattan, restaurants may generally experience a low-demand period during Sundays and Mondays, as shown in FIG. 5C.

Figure 6A:
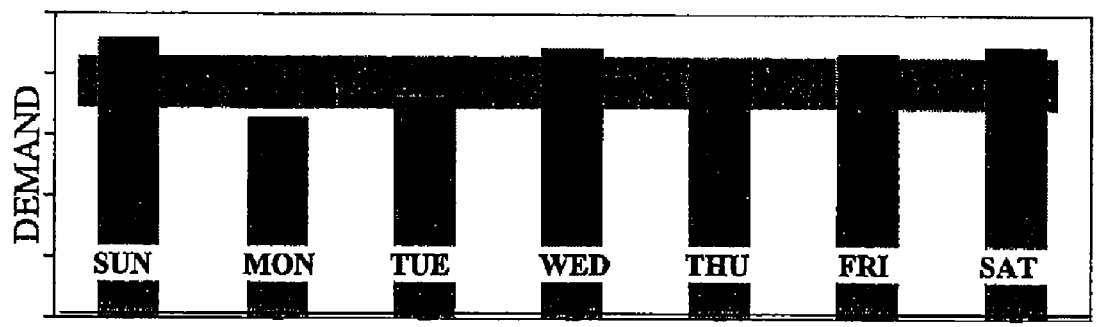
FIGS. 6A-6C are charts illustrating demand for restaurants across example neighborhoods on a per-day basis.
Figure 6B:
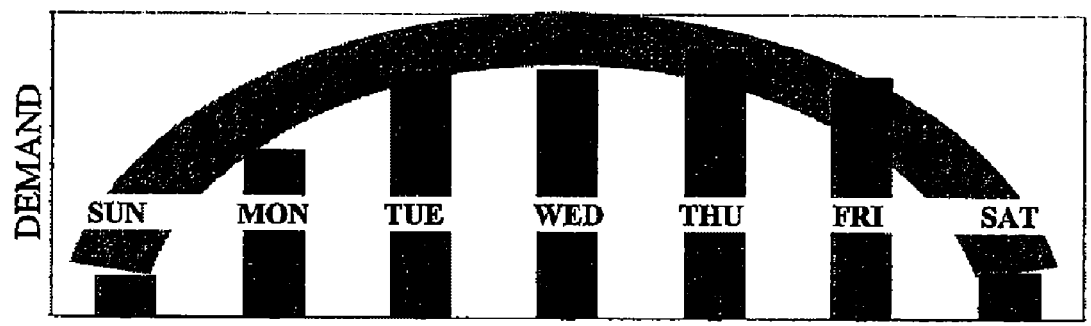
Figure 6C:
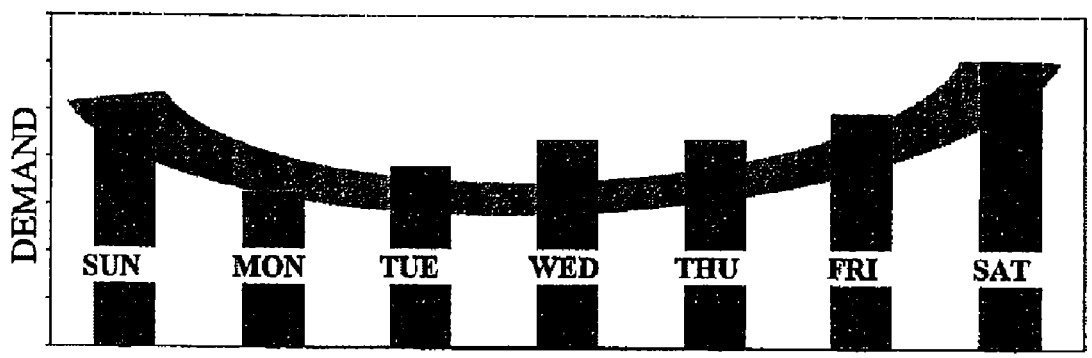

The geographic locations can be further narrowed down and analyzed by neighborhoods. For example, as shown in FIG. 6A, restaurants on the Upper East Side of New York City experience low-demand periods, and thus excess capacity, on Mondays. As shown in FIG. 6B, restaurants in the financial district of New York City may generally experience low-demand periods on weekends. As shown in FIG. 6C, restaurants in the Central Park West neighborhood of New York City may generally experience low-demand periods on weekdays.

Low-demand periods may also vary by time of day or month of year. Following the restaurant example, although some restaurants may be very busy in a time slot between 8:00 pm and 11:00 pm, the restaurants may have available seating during the time slot between 6:00 pm and 8:00 pm. In another example, some retailers experience a low-demand period following holidays. In yet another example, merchants in the entertainment industry (such as a theatre) may experience low demand on non-Friday weekdays. In still another example, a manufacturer, such as an electronics company, may experience lower demand at all times because a competitor has taken over part of the market.

As mentioned above, merchants that have periods of low demand (excess inventory) are identified based on the merchant information from network 102 and other sources such as CRM data 110 and external data 112 that are stored in data mart 304. Once such merchants are identified, the merchants may be contacted with the information about their demand patterns. Alternatively, merchants may request that an inventory turnover analysis be performed for them. If the merchant accepts inclusion in the inventory turnover program, that merchant's point-of-sale ("POS") data may be integrated into data mart 304. POS data is useful because it contains information that may not be found in other types of data in data mart 304. For example, although transaction data may be obtained through purchase records or records of charge of the cardholder, those records do not include a record of the specific items purchased by the cardholder. Specific information may be kept, however, in the POS data records kept internally by the merchant. For example, a transaction card provider may know from records of charge that a cardholder purchased music at a music store, but the music store POS records will show that the card holder actually purchased classical music at the music store. Adding this POS data to data mart 304 results in a more powerful and more accurate targeting of customers most likely and willing to respond to an offer by the merchant. POS data from the merchant can also be used to validate and segment the opportunity of the merchant to benefit from the inventory turnover program. If the merchant is willing to forego some of the profits made through discounts that would bring in additional customers in exchange for having more customers at low-demand times, customers whose needs and preferences match those of the merchant can be targeted for marketing.

Figure 7A:
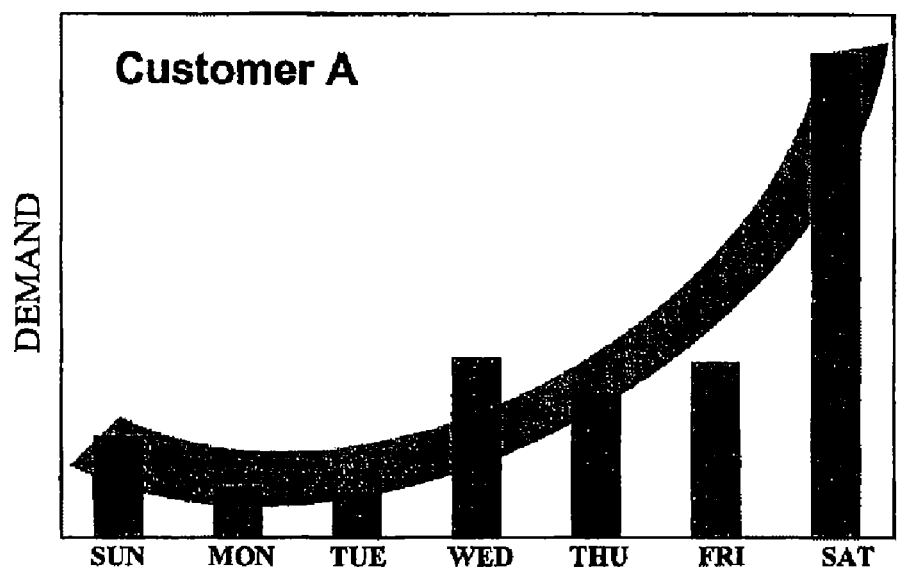
FIGS. 7A-7B are charts illustrating demand by an example customer on a per-day and per-hour basis, respectively.
Figure 7B:
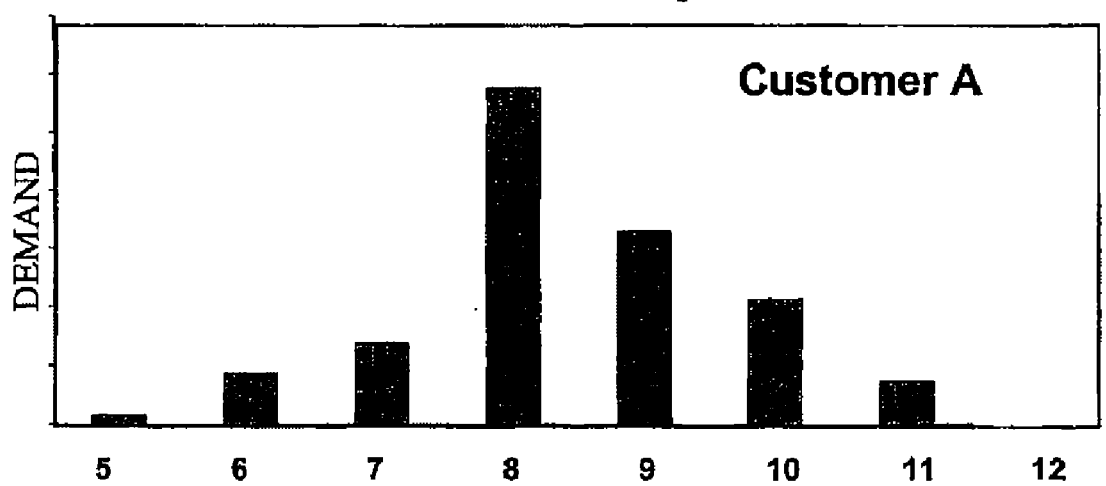
Figure 7C:
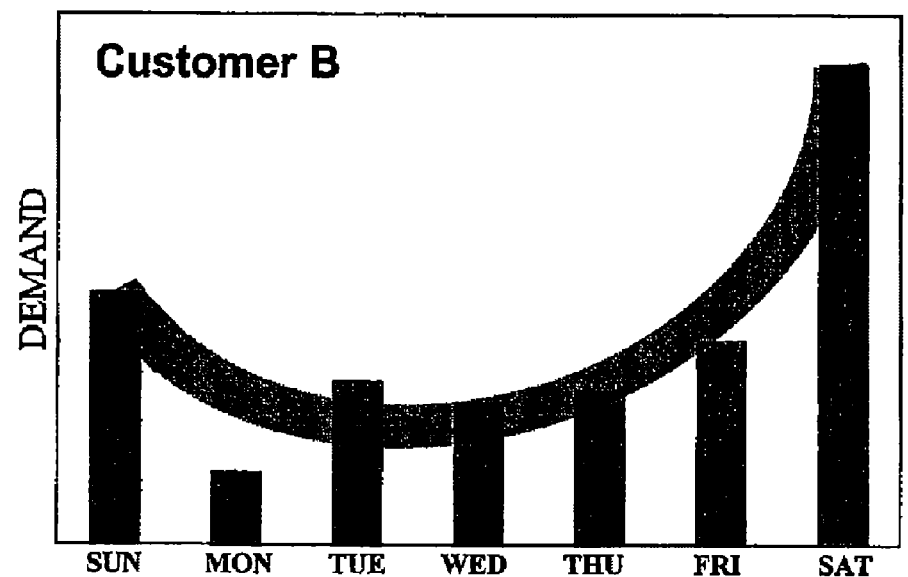
FIGS. 7C-7D are charts illustrating demand by another example customer on a per-day and per-hour basis, respectively.
Figure 7D:
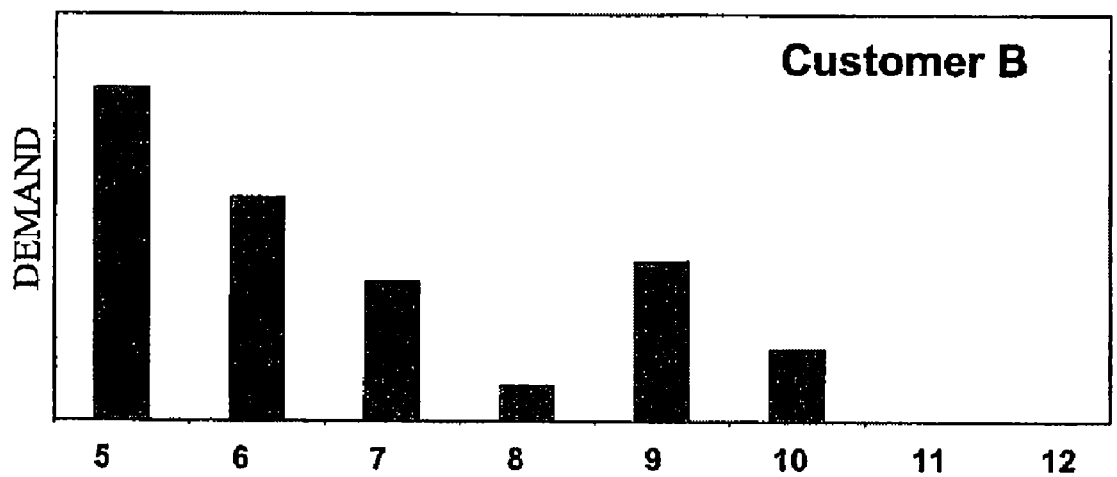

Consumer data from data mart 304 is therefore analyzed to determine which cardholders are most likely to take advantage of a discount offer by the merchant at a particular time or location. Such information can be gleaned from spending patterns of the cardholder. For example, if a cardholder typically makes retail purchases on a certain day of the week, that cardholder may be likely to take advantage of a discount offered at a retail store on the same day of the week. As shown in FIGS. 7A and 7B, a Customer A may make most of his purchases related to the industry of the interested merchant on Saturdays at 8:00 p.m. This information can be determined by reviewing the purchase history of Customer A. In contrast, as shown in FIGS. 7C and 7D, a Customer B may also make most of his purchases related to the industry of the interested merchant on Saturday, but around 5:00 p.m. If the interested merchant has excess capacity in the early evenings on Saturdays, such consumer data will indicate that Customer B would be most likely to accept an offer for discounted purchases from the merchant in the early evenings on Saturdays.

Cardholders may also be analyzed based on data from competing merchants and/or complementary merchants. Competing merchants are those who are in direct competition with a given merchant and whose products and/or services typically replace those of the given merchant. Complementary merchants are those whose products and/or services are typically sold to similar consumer groups and enhance, but do not replace, products and/or services provided by the given merchant. For example, if a merchant experiencing a low-demand period is a hotel in a particular city, data regarding customers who may need overnight accommodations in that city may be obtained from an airline company offering flights to that city. Similarly, if the merchant experiencing a low-demand period is a restaurant, data regarding customers who may accept discounted meal offers may be obtained from a hotel near the restaurant.

In this manner, data from data mart 304 is processed to identify customers most likely to accept an offer from a particular merchant during that merchant's low-demand period. One type of algorithm that may be used is a concentric circles algorithm. A concentric circles algorithm primarily uses the consumer transaction information available from a record of charge from swiping a card for making payments. Any other form of transaction information identifiable with the individual customer that captures consumer identification, merchant identification, and/or details of the transaction including time, date, amount, location, and/or detailed or aggregated information about the goods or services bought and sold through that transaction may also be used. This algorithm may also use demographic information about the merchant and the consumer. The demographic information may be obtained from internal sources as well as data vendors who maintain and supply detailed personal databases of large numbers of consumers across the world.

The POS data from the merchant gives further merchant-specific details of the transaction. For example, a retailer may have additional details related to a single transaction such as the list of retail goods and the quantities as well as unit prices of each of the retail goods purchased by a consumer during a single transaction. This data may be proprietary or owned by the merchant, and may or may not be available to the algorithm. However, the algorithm may be designed to use this data whenever available.

Figure 8:
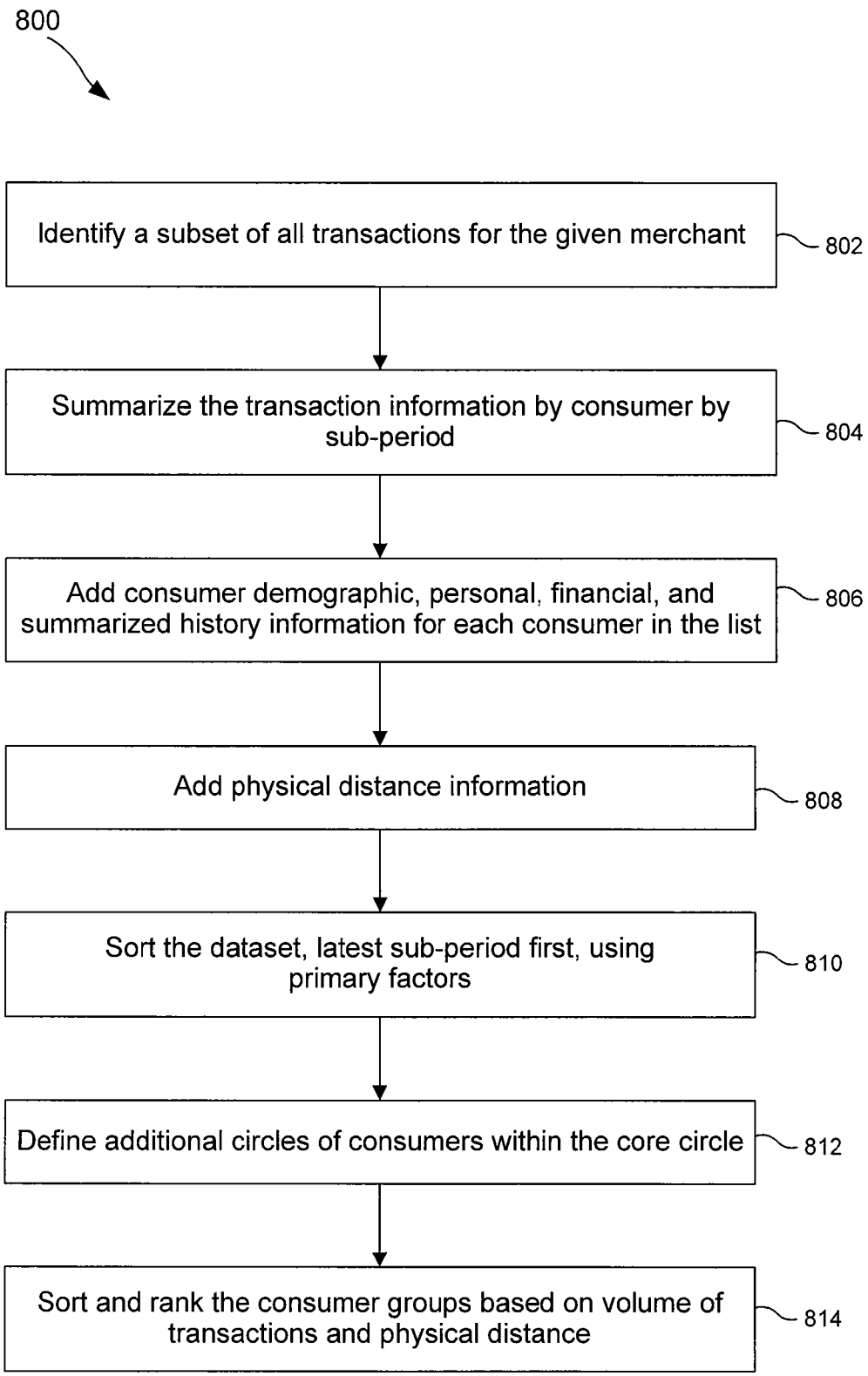
FIG. 8 is a flowchart of a method for processing data according to an example concentric circles algorithm.

The algorithm considers the most probable set of customers who may be targeted for increasing the inventory turnover for a particular merchant or class of merchants. Hence, it uses a list that begins with existing high spending/highly profitable consumers of the merchant and progressively includes more consumers depending on the merchant desire for increased demand or depth of inventory. FIG. 8 is a flowchart of a method 800 for processing data according to an exemplary concentric circles algorithm. In step 802, a subset of all the transactions for the given merchant and/or location going back as far as possible (for example, a period of 12 months if available, but preferably 3-5 years if system resources available are adequate to handle the processing load) is identified. This identifies a subperiod, such as days, months, seasons, etc.

In step 804, transaction information is summarized per consumer to include the sum of the amount spent, number of transactions and profitability (if available) by each subperiod. The sub-period size will increase with the money value of the average transaction.

In step 806, consumer demographic, personal, financial, and summarized transaction history information is added for each consumer in the list.

In step 808, physical distance (e.g., as a crow flies, or using surface transportation) from the customer to the merchant is added to the algorithm, using cartographic information and/or electronic information wherever available.

Figure 9:
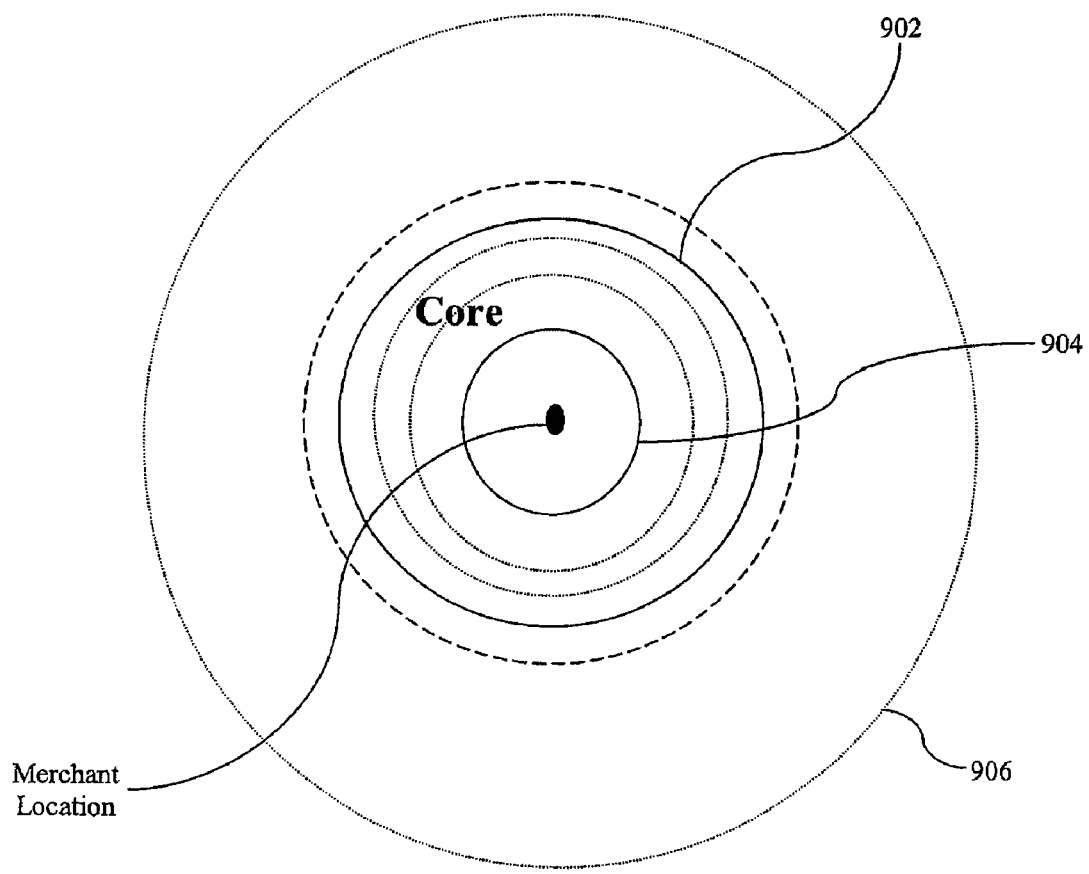
FIG. 9 is an illustration of an example result from the method of FIG. 8.

In step 810, the customer list is sorted by, for example, latest sub-period first, with money spent, number of transactions, profitability (when available), transactions during low demand, transactions during high demand, and physical distance from the merchant (when available) as primary factors. This sorted list is the main or core circle of consumers to which targeted offers for the merchant may be made with a higher probability of success. If the analysis is performed by, for example, a transaction card provider, the sorted list may identify the customers most likely to take advantage of a joint offer between the merchant and the transaction card provider. These core consumers are illustrated by core concentric circle 902 in FIG. 9.

In step 812, within core circle 902, additional concentric circles are defined. Each concentric circle corresponds to each partition of consumers sorted by amount spent in the latest sub-periods with the merchant.

In step 814, each of the groups defined in step 812 are further sorted and ranked based on the volume of transactions within low and high demand periods as well as physical distance from the merchant. The groups thus formed have the inner circles populated by consumers with higher probability of responding to a targeted offer to transact with the merchant during low-demand/low-turnover periods. Group 904 in the innermost circle corresponds to the customers most likely to respond to a discount offer by the merchant.

Figure 10:
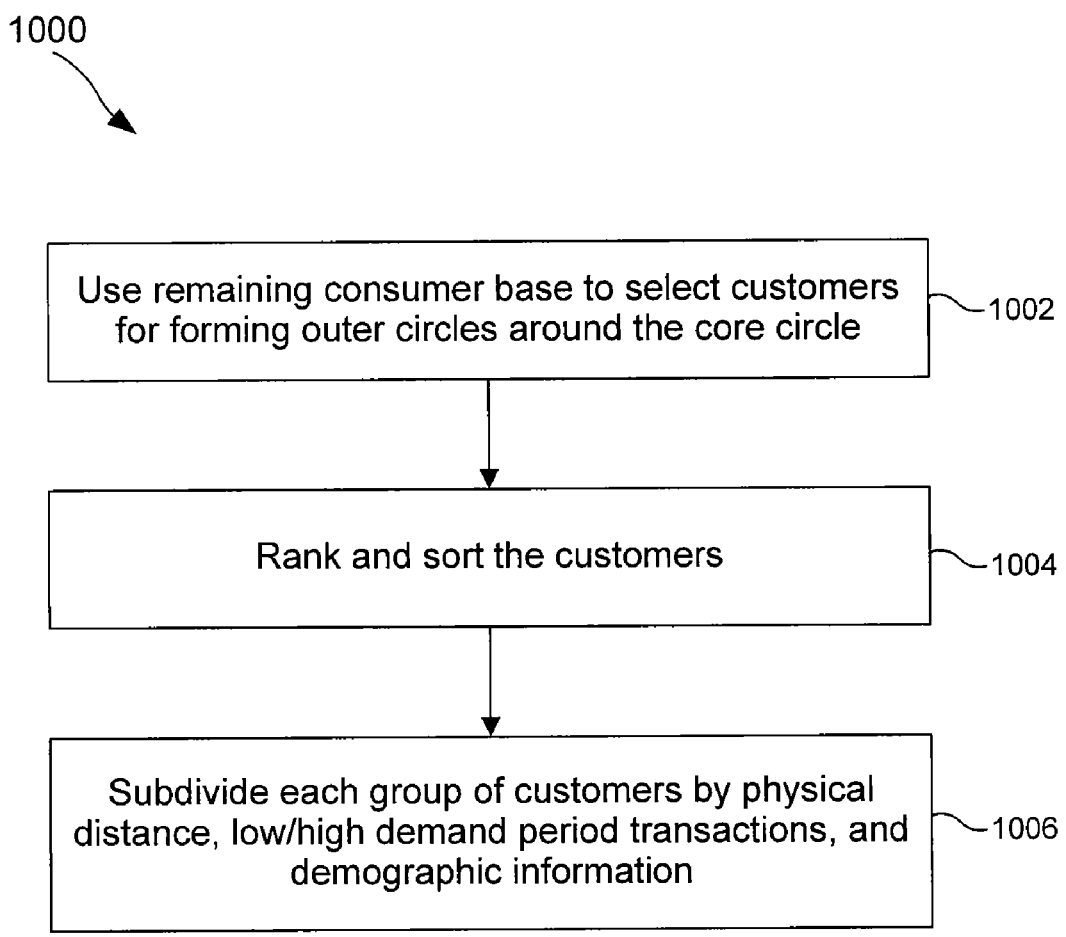
FIG. 10 is a flowchart of a method for further processing data according to an example concentric circles algorithm.

Referring to FIG. 10, an additional method 1000 may be used to target customers for forming outer circles around core circle 902. In step 1002, customers in the customer list that were not included in core circle 902 are selected based on the following example characteristics: transactions (e.g., amount per transaction or number of transactions) with competing merchants in the vicinity and in the direct marketing area ("DMA"), transactions with other competing merchants, transactions with merchants in the same specific industry category (may not be directly competing merchants), and transactions with merchants in complementary industries.

In step 1004, a similar mechanism to method 800 is used to rank and sort these consumers by the above characteristics, starting with amount and number of transactions with competing merchants in the latest sub-periods, in the same industry category and in the complementary industry categories.

In step 1006, each of the groups is subdivided by physical distance from the merchant, low/high demand period transactions, and/or demographic information, which is used more specifically while grouping within consumers having activity in the complementary industry category in the latest sub-periods. The consumers which do not belong to any of these circles form outermost circle 906, and represent the customers least likely to respond to the merchant offer to use the low demand/low turnover period.

Additional factors may be included in the concentric circle formations. For example, response rates from any previous offers may be included. In this example, the algorithm may use scores from econometric models which score all consumers based on responses from earlier targeted offers as a ranking variable. The algorithm may also allow flexibility in choosing the most important factor deciding the innermost concentric circles.

Similar results to the concentric circles algorithm may be achieved using a simple weighted scoring mechanism where the amount, number of transactions, period of transactions, profitability, and physical distance from the merchant are given weights, and a score is calculated for each of the consumers in the consumer list. When this weighted scoring method is used, only the score is used for sorting and ranking the consumers. However, it is found that many merchants prefer the concentric circles grouping because it is more simple and intuitive to understand without involving mathematics. Additionally, the concentric circles model assists visual thinking and allows direct interaction with actual consumer information such as amount spent or physical distance rather than a derived score. The scoring method is more useful while working with merchants having multilocation or chain operations with a large number of locations, who require a more computer intensive mechanism than a visual and intuitive mechanism.

Using the consumer groups identified by the consumer algorithm, the merchant can determine which consumer groups should be targeted. In a practical example of the concentric circles algorithm, a classical music store merchant may need to target customers for weekday morning low-demand periods. In this example, 24 million cardmembers are included in network 102. Out of those 24 million, only 12 million are actively spending each month. Within that group, only 6 million buy music. Within that group, only 2 million purchase classical music. Within that group, there is a subset of 500,000 who make multiple classical music purchases in a month. Of that group, only 5,000 cardmembers shop in the same area as the classical music store. Of that group, only 500 cardmembers regularly shop on weekday mornings. Thus, using the concentric circles algorithm, those 500 people most likely to buy classical music in the area on weekday mornings can be specifically targeted by the merchant without wasting marketing efforts on those not likely to buy classical music in the area on weekday mornings.

Once the cardmembers most likely to accept an offer by the merchant have been identified, they are targeted with the discount offer from the merchant. The cardmembers' information can be analyzed to determine appropriate channels for communicating the merchant's offer to the targeted cardmembers. The channel may be based on individual cardmember preferences, and may include, for example and without limitation, direct mail, email, and telephone calls.

Since the discount offer is targeted to the cardmembers most likely to accept the offer, a higher rate of acceptance is achieved as compared to broad-based techniques. Once offers have been accepted, information about the cardmembers who accept the offer and their transaction data can be added to data mart 304 to further enhance the targeting process.

Figure 11:
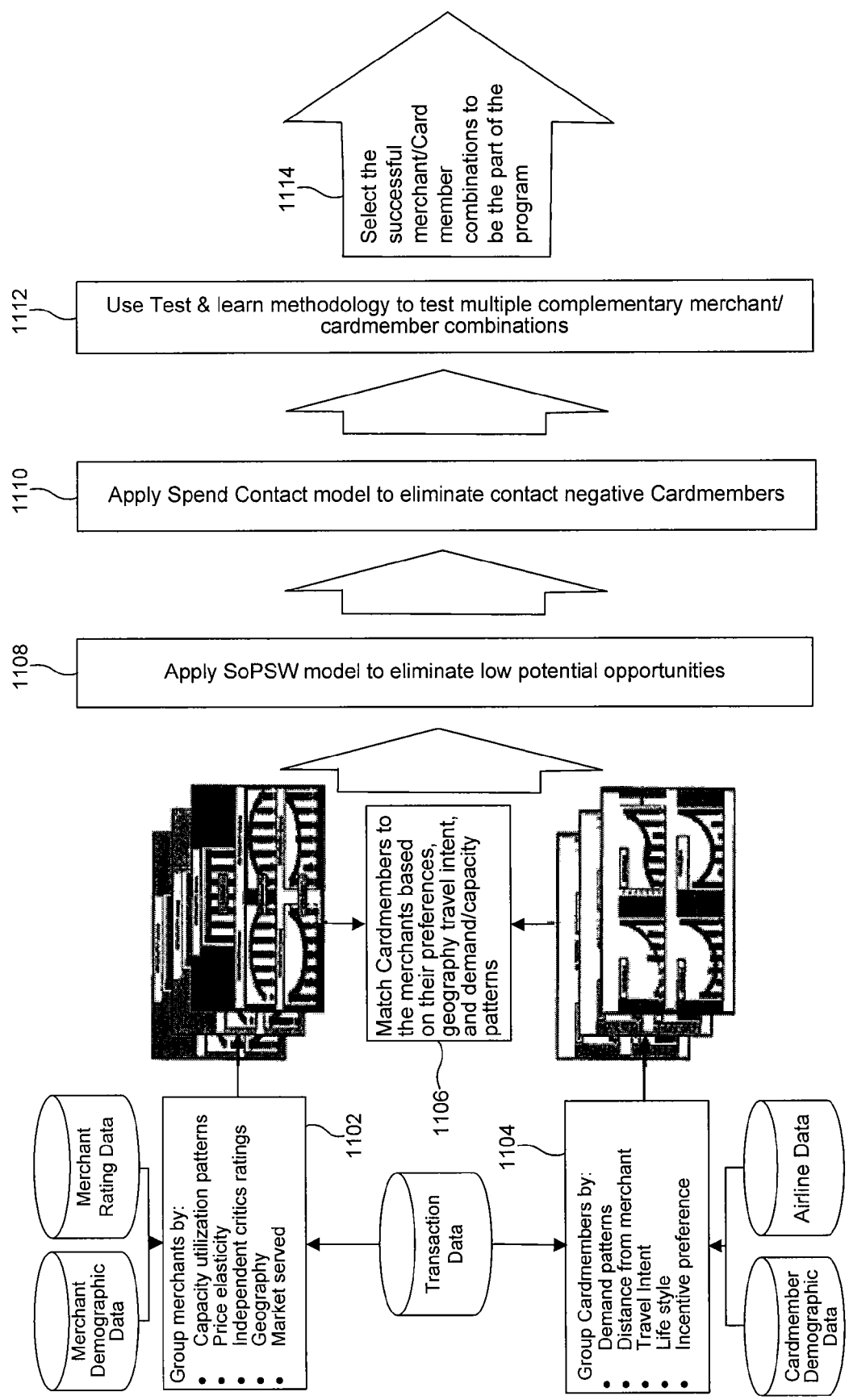
FIG. 11 is a flowchart of a method for targeting customers.

FIG. 11 is a flowchart of another example method for targeting customers. In step 1102, transaction data, merchant demographic data, and external ratings data are analyzed to classify merchants. Merchants may be classified, for example, by capacity utilization patterns. Merchants have different levels of capacity utilization, which may be based on location, time of day, day of the week, or seasons. In another example, merchants may be classified by the merchant's response to low demand. This is also referred to as price elasticity and takes into consideration that some merchants reduce prices during low-demand periods while others tend to maintain prices to protect the brand image. Merchants may also be classified based on how they are rated by independent critics, geography, and/or the markets served by the merchant.

In step 1104, transaction data is combined with customer demographic data and, for example, airline data to classify the customers. Customers may be classified by demand patterns, since customers may have preferences to shop during specific time slots, on certain days of the week, or during a particular season. Customers may also be frequent shoppers or non-frequent shoppers. Customers may also be classified by their distance from the merchant, and coordinates of the customer and merchant can be used to calculate the distance. Customers may be classified based on their travel intent. Airline data, for example, may be used to identify which customers are traveling where and when. Customers may be classified based on lifestyle, such as whether they prefer upscale or economy merchants, their age, or how many children they have. Additionally or alternatively, customers may be classified based on their incentive preferences, such as whether the customer responds to discount incentives or experience incentives.

In step 1106, customers are matched with merchants based on their preferences, geography, travel intent, and/or demand/capacity patterns.

In step 1108, a size of spending model is applied to determine how much spend potential the customer has. Customers having the lowest spend potential are eliminated from the inventory turnover targeting program. An example spending model that may be used in conjunction with the present invention is discussed in U.S. patent application Ser. No. 10/978,298, filed Oct. 29, 2004, and titled "Method and Apparatus for Estimating the Spend Capacity of Consumers," which is incorporated by reference herein in its entirety.

In step 1110, a spend contact model is applied to determine customers whose spend declines in response to solicitation. These customers are also eliminated from the inventory turnover targeting program.

In step 1112, merchants and customers are grouped based on complementary demand/capacity patterns, customer lifestyle, merchant ratings/characteristics, and/or geographic proximity (e.g., the customer is either living or will be traveling to a location close to the merchant during the promotion period). Based on the incentive preferences of the customer, multiple levels of incentive may be tested using test and learn methodology. The merchant-specific test is then fielded.

In step 1114, based on the test results, the most successful combinations are selected that meet financial hurdles for both the merchant and a financial company controlling the closed loop network. The final discount offer program is based on these combinations to enhance return on investment for the merchant and provide discounted price and/or a preferred experience to the consumer.

This type of customer targeting offers a powerful marketing tool that can be used in many permutations. For instance, the method can be altered to include data from complementary merchants. In an example complementary merchant scenario, most customers book airline flights several weeks in advance. The airline flight information can be used to determine a particular area that the customer may be visiting. Based on other transaction data related to the customer's transaction account, it may be determined that the customer likes to eat at a particular type of restaurant. The customer can then be targeted by a restaurant of the preferred type at the location to which the customer is flying who may be experiencing a low-demand period at the time of the customer's visit.

Customer targeting need not be restricted to complementary industry targeting. If there is high demand for a particular product or service produced by one company, and low demand for a product or service of similar quality in a similar location by a second company, customers may be offered a discount for purchases made from the second company. The customers benefit, because they are given the option of purchasing a similar item from an alternative company that the customers may not have been aware of. The second company also benefits because, even with the discount, the second company reduces its excess inventory.

Recommendations may also be made based primarily on consumer transaction information. A customer may make a purchase from a particular merchant. Data mart 304 may then be searched to determine other customers who also made a purchase from the same merchant. Once these additional customers are identified, their transaction data can be analyzed to determine a set of merchants most often used by those additional customers. The original customer may then be targeted by the set of merchants. For example, if a customer makes a purchase at a particular restaurant, other customers who made purchases at the same restaurant are identified. The most popular restaurants in the same location that the original customer might enjoy can be ranked based on the additional customer transaction information. The original customer can then be targeted with offers from those additional restaurants.

III. Restaurant Yield Management Portal

Further applications to the system described above can be in the area of food and hospitality industry. Specifically, the system described can be used to improve the yield of a restaurant or a hotel that wishes to get rid of its immediately perishable inventory, e.g., tables in the case of a restaurant and rooms in the case of a hotel. According to one embodiment of the present invention, described below is an exemplary restaurant yield management portal with the aim to generate incremental business for a restaurant or a hotel. It is to be noted that although this portal is being described in terms of a restaurant, it can also be applicable to any other business entity that has a need to get rid of its perishable inventory items. The case of a restaurant is used as an example only, and not as a limitation.

1. Introduction

A fundamental problem for any business dealing with perishable inventory has been to maximize, in a substantially short period of time, the sales associated with such perishable inventory. Past methods to deal with this problem include untargeted discounting and special customer perks. However, none of the past methods have tried to solve the problem in a discrete manner, so as not to affect the consumption and purchase experience for the customer exercising the offer. It is also important that any method or system attempting to solve this problem does so in as non-disruptive a way as possible, such as through reservations and couponless discounting. That is, the system or method in use should let the customers and merchants interact and conduct business as usual. Additionally, a method or system should make available simple, self-service targeted marketing methods and provide access to "push" channels such as, for example and without limitation, email and text messaging channels. Further, the system or method should allow dynamic submission of inventory by a Service Establishment (SE).

The restaurant yield management portal is a system and a method to enable merchants to generate incremental inventory sales. Merchants will provide the details of an inventory that is "at risk" to a transaction card company to be marketed to its cardmembers at a discounted price via the web, email, Short Messaging Service (SMS), a telephone call or any other form of communication known to persons having skill in the art. If the cardmember ("CM") decides to avail the offer of a discount, the CM makes a reservation with the card company, dines at the restaurant, and pays for the meal using a card associated with the card company. The discount is then automatically applied, after a sale, to the CM's account via a statement of credit.

Figure 21:
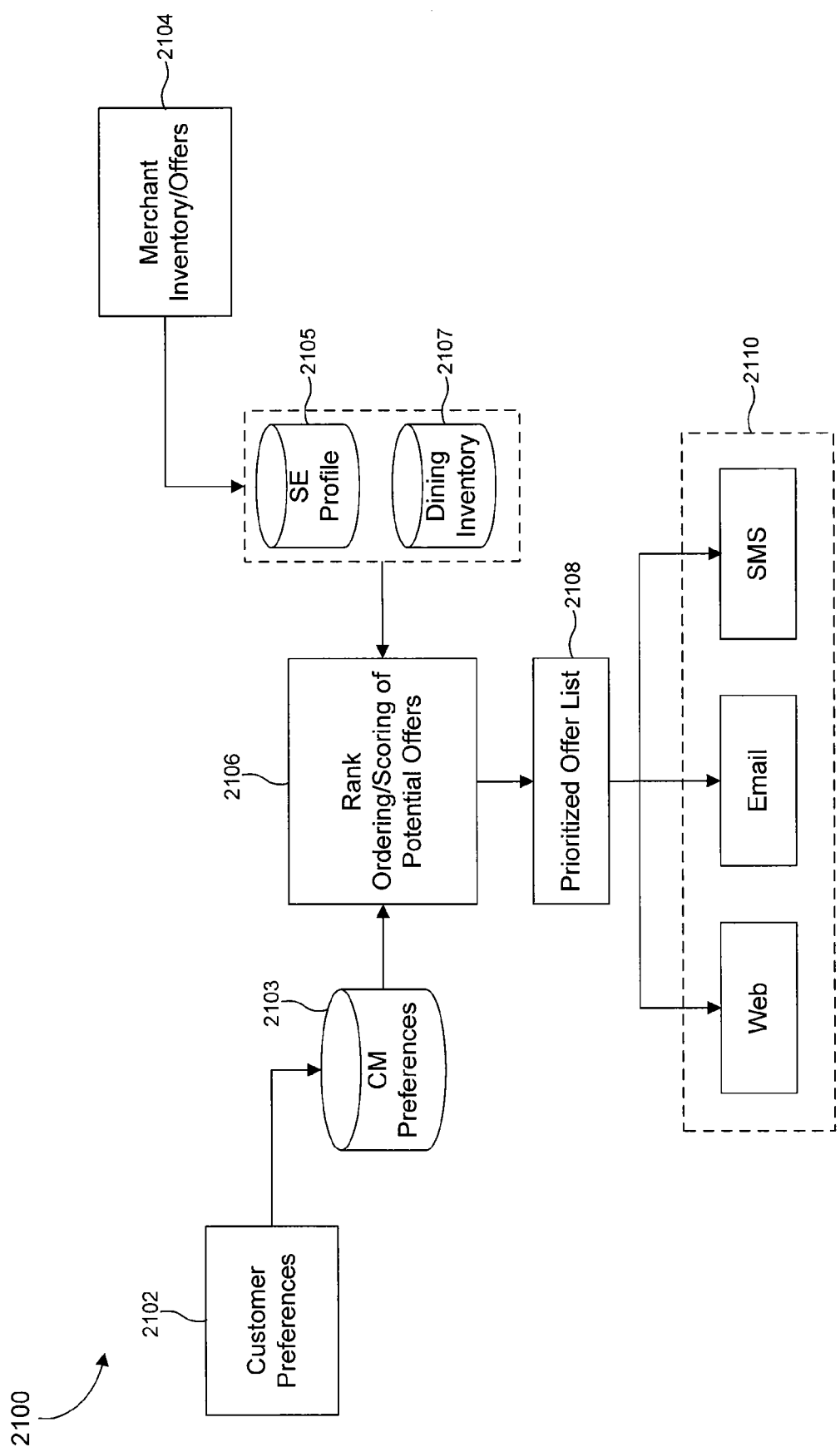
FIG. 21 shows an exemplary method of matching preferences.

Similar to the methods described with respect to targeted marketing of products, CM preferences are collected upon enrollment to match available offers with the most relevant program enrollees (as will be described below with respect to FIG. 21). Periodic communications are then sent to these program enrollees containing offers that match their preferences.

It is common practice for businesses wishing to clear their inventory to send generalized coupons for various products by mail or emails. Those coupons can then be redeemed by the consumer by physically taking the coupon to the stores and getting a rebate. This process adds additional steps on the part of the merchant like printing and mailing the coupons, and tracking and accounting for coupon usage after the sale. It also does not take into account user preferences. Most importantly, this system will fail if the merchant wants to clear the inventory in a time frame that is substantially close to current time, say within 24 hours.

The current invention seeks to minimize such losses occurring due to un-used perishable inventory that could not have otherwise been sold in a very short duration of time. It should be noted that although this invention is useful for short-term sale of perishable inventory, it is equally applicable to sale of regular and long-term non-perishable inventory too.

Thus, a real time targeted marketing method through various channels based on customer defined preferences is provided. The system provides for couponless fulfillment of offers, at the same time letting customers and merchants conduct business as usual. The merchants can sell "at-risk" inventory both far in advance and at the last minute and the customers benefit from savings on products/services and also get to know new merchants which they otherwise would not have encountered. Merchants can also track and understand how well a particular sales strategy is working for them.

2. Acronyms Used in Drawings and Specification
BAU—Business As Usual
CAP—Collection or group of Service Establishments (Merchants) under common ownership
CM—Card Member
FINCAP—Financial Capture System
IVR—Interactive Voice Response
MTC—Merchant Teleservicing Channel
GUI—Graphical User Interface
OMS—Online Merchant Services
UID—User ID
PW—Password
ROC—Record of Charge
SE—Service Establishment (Merchant)
SMS—Short Messaging Services (text messaging)
SSO—Single Sign on
WAP—Wireless Application Protocol
RSS—Really Simple Syndication (an online publishing technology)

3. Concept Overview

Figure 13:
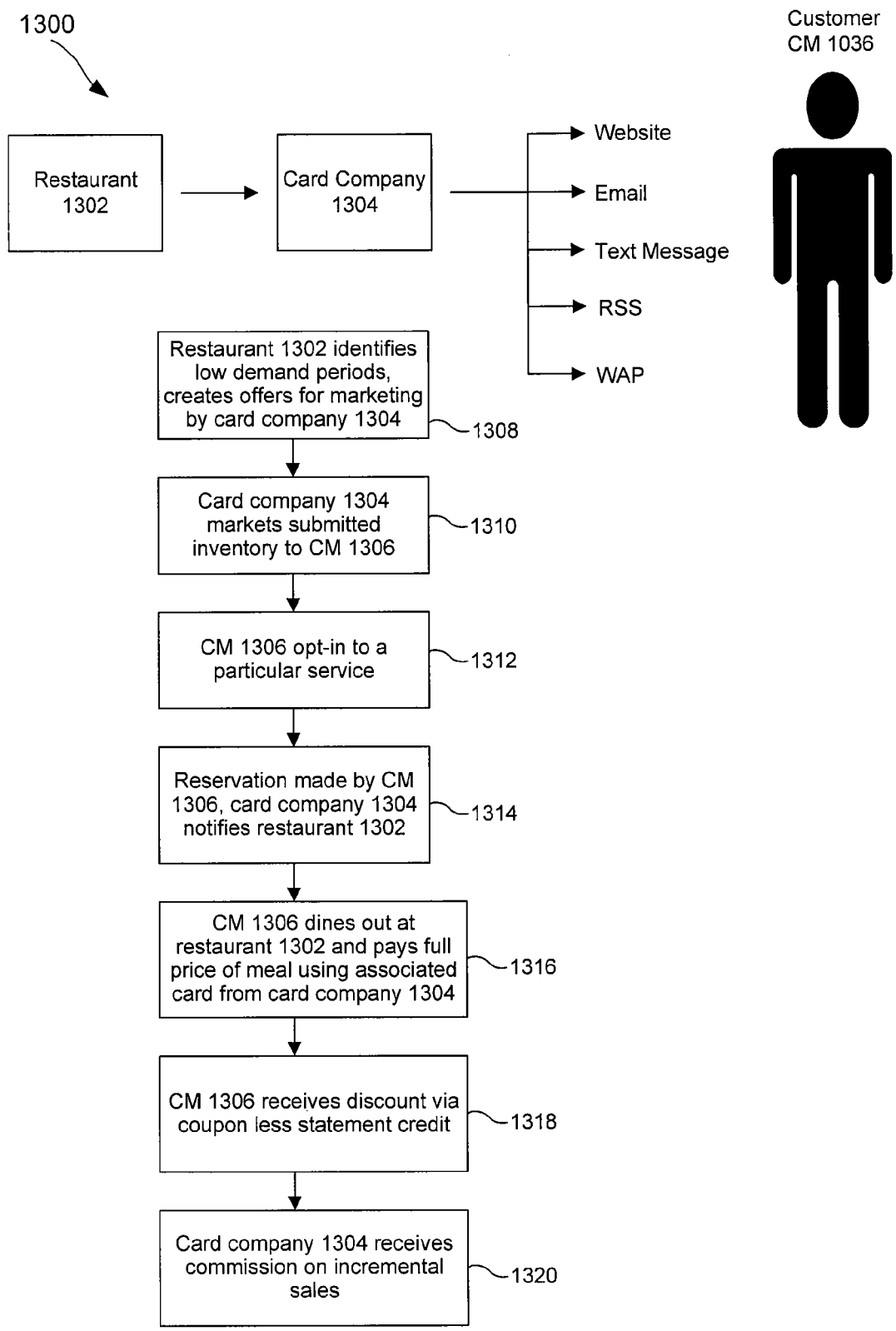
FIG. 13 is a general flowchart showing various processes involved in an exemplary restaurant yield management portal.

FIG. 13 illustrates an overview of an example restaurant yield management portal by means of a flowchart 1300. Flowchart 1300 shows the interaction between three participating entities—a merchant 1302, a card company 1304 and a CM 1306. Communication between merchant 1302 and CM 1306 occurs via card company 1304 by means of, for example and without limitation, a website, an email, a text message, RSS (an XML-based format for content distribution), WAP, etc., as is also shown in flowchart 1300.

In step 1308 of flowchart 1300, merchant 1302 identifies periods of low demand based on the merchant information from network 102 of FIG. 1 and creates deals to entice card members to a sale at different times more than once.

In step 1310, card company 1304 markets the submitted inventory to CM 1306 (or to many such CMs like CM 1306) based upon a matching of submitted preferences of enrollees and/or in-program transactional history with the offer inventory from merchant 1302. The marketing may be "pull marketing," in which CM 1306 can voluntarily review (or pull out) available inventory uploaded on card company 1304's website by merchant 1302. Alternatively, the marketing may be "push marketing," in which card company 1304 can send (or push out) targeted communication to any relevant CM 1306 based on preferences or in-program transaction history. An example method 2100 of matching preferences is further illustrated in FIG. 21.

Method 2100 begins with step 2102, in which CM preferences are determined. CM preferences may include basic preferences, which include the minimum information required to promote relevant offers and fulfill couponless offers. Basic preferences may include, for example and without limitation, authentication information (e.g., user name and password), the CM's name, the CM's email address, the CM's credit card number, the CM's preferred cuisines and geography, and the minimum party size for the CM.

CM preferences may also include push marketing preferences, which identify the manner in which the customer wishes to receive information about the offer. Push marketing preferences may differ depending on whether the channel is a periodic newsletter (e.g., digest) summarizing offers that meet the CM-defined search criteria or whether the channel is a "Flash" alert triggered by specific inventory upload and sent out immediately prior to the event. A "Flash" alert generally refers to an offer created instantaneously in very recent time and is pushed out mainly via a text message. Periodic newsletter preferences may include, for example and without limitation, the minimum number of days of advance notice required by the CM, the minimum quality rating (e.g., Zagat rating or Gayot rating), preferred geographies and cuisines, and the frequency with which the CM wishes to be contacted with the periodic newsletter. "Flash" alert preferences may include, for example and without limitation, preferred contact channels, the CM's contact details, available times for the CM, preferred target restaurants, and preferred target meals. All this information may be saved in a CM preferences database 2103.

Additionally, in-program transaction history of the CM may be analyzed to determine CM preferences.

In step 2104, a merchant 1302, such as a restaurant, submits inventory details to the reservations portal. The details may be submitted, for example, via a password-protected website or a toll-free telephone number with various options.

Such a submission typically occurs on a regular basis once merchant 1302 is enrolled for participation with the reservation portal.

When merchant 1302 is first enrolled, merchant 1302 submits merchant profile information that can be used for preference matching and financial settlement. The information specific to merchant 1302 may include, for example and without limitation, restaurant authentication information, the merchant's name, the merchant's SE number, the merchant's address, contact information for the merchant, the address of the merchant's website, hours of operation of the merchant, a descriptive profile of the merchant, the merchant's geography, and the merchant's cuisine and type of dining. This information may be stored in a SE profile database 2105. The SE profile database may also include third party information, such as a rating and/or review of the merchant, the merchant's price point, or a map of the merchant's location.

After merchant 1302 has been enrolled with the reservations portal, the inventory submissions from step 2104 for dining inventory to be marketed exclusively by card company 1304 are made periodically. The periodic submissions may include, for example and without limitation, a date and/or time an offer may be redeemed, a location at which the offer may be redeemed, and a table size for the offer. Such information may be stored in a dining inventory database 2107. Merchant 1302 may also offer card members incentives through various schemes.

Once the CM preferences are received in step 2102 and the merchant inventory is received in step 2104, method 2100 proceeds to step 2106. In step 2106, potential offers are rank ordered and scored based on the CM preferences. Step 2106 takes into consideration two types of preferences, absolute preferences and ranking preferences. Absolute preferences are those preferences that can be used to screen out undesirable inventory, such as the date of a reservation and a location of the restaurant. For example, if the CM lives in New York, the CM would not be able to avail offers for restaurants in San Francisco, and those offers can be completely removed from the list of available offers.

Ranking preferences are those preferences that can be applied to score and identify the most relevant inventory. Ranking preferences include, for example, a preferred cuisine type, a preferred time of reservation, and a preferred restaurant rating. The CM preferences are applied to potentially available offers, which are then scored and ranked in order of likely relevance. For example, if preferences indicate that a CM enjoys Italian cuisine, an offer for an Italian restaurant will be ranked higher than an offer for a French restaurant, but the offer for the French restaurant is not completely removed from the list of available offers.

In step 2108, a prioritized offer list is created. The prioritized offer list is provided to the CM in step 2110. Based upon a capacity of the channel (e.g., a website can display many offers, an email may display fewer offers, a text message can display even fewer offers), the number of offers may vary for a given channel, with the capacity being filled with the highest-ranking offers in the prioritized offer list.

Through method 2100, merchants (such as restaurants or hotels, or any other business that wants to avail this system) are thus enabled to sell inventory discretely through targeted communication instead of broadcast advertising.

Returning to FIG. 13, in step 1312, CM 1306 can opt into general service programs and then accept specific offers marketed by merchant 1302, according to his or her preferences.

In step 1314, CM 1306 then makes a reservation with merchant 1302. The reservation can be made, for example, through direct access via an online reservation capability at card company 1304's website, or by clicking, for example, a hyperlink that takes CM 1306 to card company 1304's online reservation website in an email message, or by replying back to a text message. Card company 1304 then notifies merchant 1302 of the reservation by, for example, phone, email, fax or its website.

In step 1316, CM 1306 dines at merchant 1302 and pays a full price of the meal at the time of sale using a card issued to CM 1306 by card company 1304. Following this, in step 1318, CM 1306 receives a financial incentive in the form of a discount via either a direct couponless statement credit on his or her statement corresponding to the card account or a deposit of rewards points to a rewards program account associated with the card. An advantage of the couponless transaction is that CM 1306 does not have to physically present any coupons at participating merchant 1302 to fulfill the discount. Instead, CM 1306 can avail a reservation just like any other CM who is not enrolled in such a scheme and pay a full price at the time of sale. Besides being credited for a discount in his or her statement, another exemplary financial incentive to CM 1306 statement is the benefit of an offer for a discount at a very short notice to a selected group of CMs like CM 1306. In such a situation, only those CMs who are actively searching for perishable inventory or signal via their preferences or in-program transaction history that they may be interested in an offer and who are quick enough to avail the offer will receive statement credit for the purchase.

Based on steps 1316 and 1318, in step 1320, card company 1304 receives a commission from merchant 1302 on any such incremental transaction (or sale).

Figure 14:
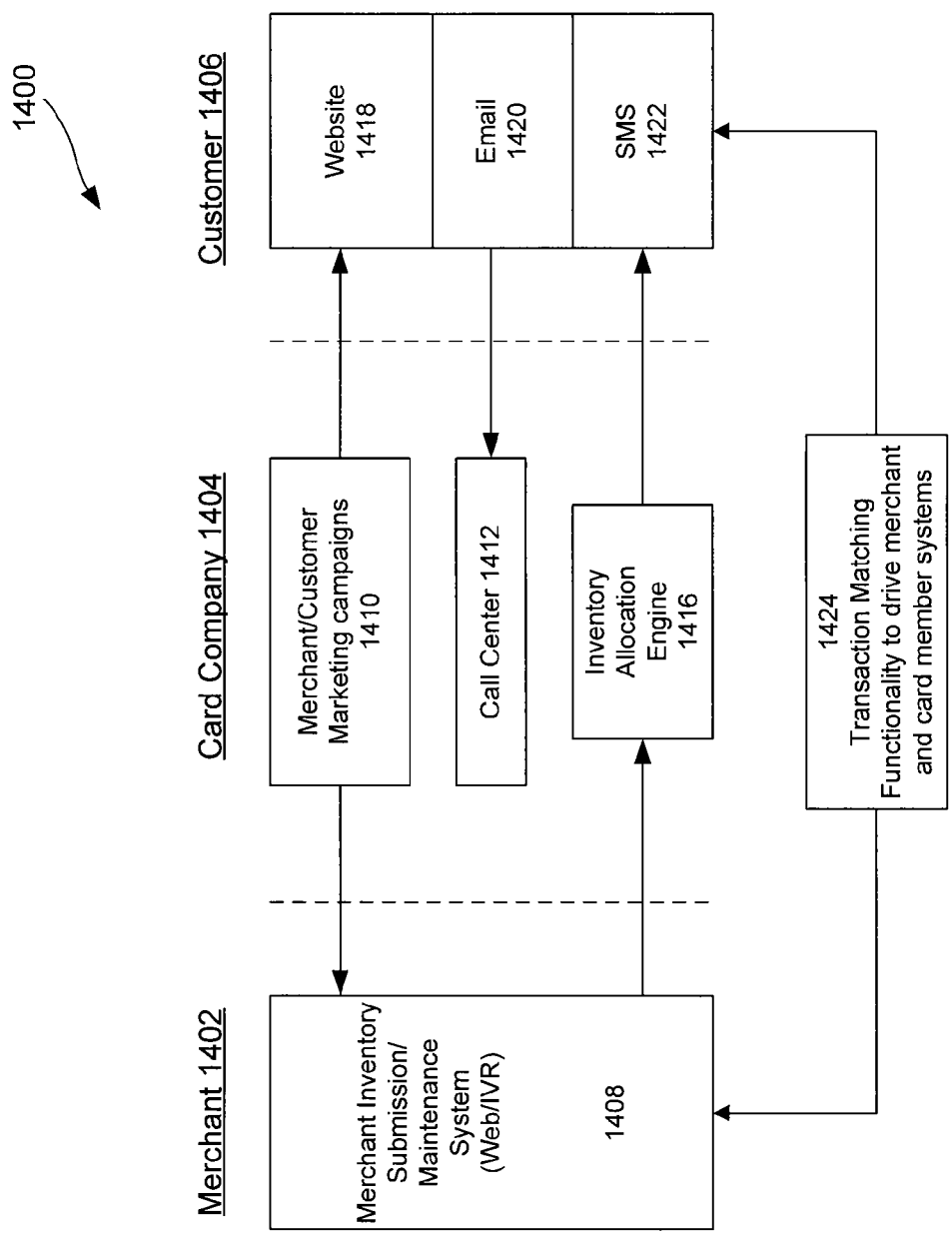
FIG. 14 illustrates further details of the restaurant yield management portal, according to an embodiment of the invention.

FIG. 14 shows a block diagram of an example restaurant yield management portal 1400. Portal 1400 has mainly three components—a merchant component 1402, a card company component 1404 and a customer component 1406. Merchant component 1402 has a merchant inventory submission/maintenance system 1408. System 1408 includes a web-based interface or an IVR system. System 1408 interacts with an inventory allocation engine 1416 designed to match preferences related to any CM 1306 of FIG. 13. System 1408 also interacts with a card company component 1404 via merchant/customer enrollment campaign system 1410. System 1410 handles enrollment campaigns for merchants and customers to enroll in the services. Card company component 1404 also has a call center 1412 designed to handle calls to merchant component 1402 to notify SEs of a sold reservation, confirm any reservations or bookings made through customer component 1406, or for any general assistance purposes.

System 1410 is basically a campaigning mechanism for increasing customer membership and for directing existing and potential customers to website 1418. Inventory allocation engine 1416 provides output to website 1418. The output of inventory allocation engine 1416 is also used to provide content for email 1420 or SMS 1422 to a CM 1306. Retired or deleted items in the current inventory updated by system 1408 may not be displayed on program website 1418 or marketed via email platform 1420 or SMS platform 1422.

At a high level, merchant 1302 gives card company 1304 an offer to market. Card company 1304 takes that offer, applies preferences using engine 1416, and markets the offer to CMs 1306 who most likely would want the offer via platforms 1418, 1420 and 1422. A CM 1306 accesses program website 1418, reviews available offers, and makes a specific reservation. That reservation is then taken out of card company 1304's inventory database. At the same time, when that reservation is made through website 1418, an email is triggered to call center 1412. Call center 1412 then contacts merchant 1302 to notify merchant 1302 that an offer having a certain discount amount has been accepted.

Additionally, for all transactions occurring between merchant component 1402 and customer component 1406, there is a transaction matching facility 1424 to provide couponless discounting and to drive the merchant and CM systems. Matching is done on a periodic basis.

Figure 15:
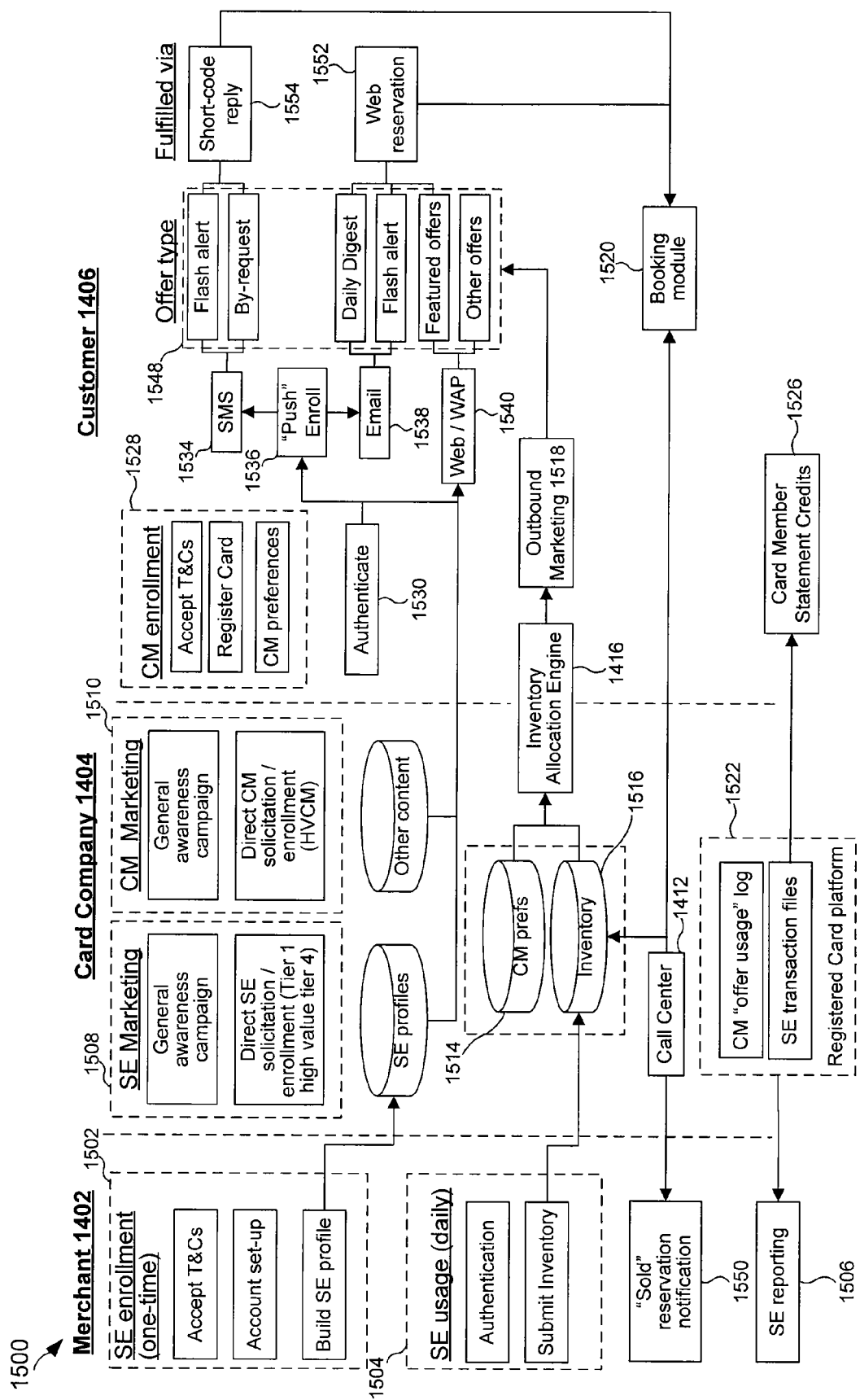
FIG. 15 illustrates yet another embodiment of the restaurant yield management portal.

FIG. 15 describes the elements of example portal 1400 in more details. As shown in the detailed block diagram 1500, merchant component 1402 contains a SE (merchant) self-enrollment system 1502 and an account detail system 1504. SE self-enrollment system 1502 allows merchant 1302 to, for example, accept terms and conditions of the portal, set up an account with the portal, and build a SE profile. Account detail system 1504 provides, among other things, an authentication method, a method to submit inventory and an account management system. An SE statementing and reporting system 1506 receives data from card company component 1404 and provides it to merchant component 1402.

Card company component 1404 includes an SE marketing system 1508 and a CM marketing system 1510. SE marketing system 1508 is used to raise general awareness for the portal among merchants, as well as to directly solicit and enroll specific merchants 1302. Similarly, CM marketing system 1510 is used to raise general awareness for the portal among customers, as well as to directly solicit and enroll specific CMs 1306.

Inventory allocation engine 1416 in card company component 1404 further receives data from a CM preferences database 1514 and an inventory warehouse 1516 to store any patterns or preferences related to CM 1306. Data in the inventory allocation engine 1416 can be used by an outbound marketing module 1518, which sends offers to CM 1306 through customer component 1406. In return, there is an inbound booking module 1520 which communicates with an inventory warehouse 1516. Inventory warehouse 1516 is used to store any bookings made through customer component 1406 along with unbooked offers submitted by merchant component 1402. Inbound booking module 1520 also communicates with call center 1412, to notify an SE of a sold reservation. For example, booking module 1520 can send an email to call center 1412. In addition to reservation notification 1550, merchant component 1402 can include a backup/secondary notification module, such as a module that generates an email or fax numbered notification of inventory that has been reserved by customer 1406.

Card company component 1404 has a registered card platform 1522 delivering couponless offers to eligible CMs transacting at eligible SEs at eligible times or days. Registered card platform 1522 may include, among other things, a CM log and an SE transaction log for tracking or checking various transactions. Data from registered card platform 1522 is used to create cardmember statement credits 1526.

Customer component 1406 has a self enrollment module 1528, which allows CM 1306 to accept terms and conditions of the portal, register a card associated with card company 1304, and enter CM preferences. Customer component 1406 also includes an authentication module 1530 for authenticating CM 1306. After being authenticated, CM 1306 can log in to a website 1540. Website 1540 may contain offers for which CM 1306 can make a reservation 1552. Reservation 1552 can be provided to card company component 1404 through booking module 1520. The customer may also enroll in "push" marketing via enrollment module 1536. Such push marketing can be communicated through an SMS module 1534 or an email module 1538. Offer type 1548 provided through customer component 1406 may include, for example, a by-request message (where a CM requests that an offer be provided to him or her based upon pre-existing short-codes which correspond to, for example, a desired geography or a meal type), a daily digest message (e.g., newsletter), or a "Flash" email alert. CM 1306 can respond to SMS marketing via a short code reply 1554, which triggers a reservation through booking module 1520. Details of example daily digest and "Flash" email alert are provided below.

3.1 Example 1: Newsletter

The newsletter is a customized periodic email summary (i.e., digest) of inventory availability that matches CM-specified preferences as per information stored in CM preferences database 1514. Through newsletters, CMs can receive customized emails. A pre-determined or customized number of emails can be sent to each CM per day outlining restaurants that match search criteria set by CM 1306 for up to any time in the near future (e.g. next 5 days). The number of emails can be capped (via business rules) so that no specific restaurant can appear more than a fixed number of times per day in such emails to CM 1306. After receiving such an email, CM 1306 may follow a hyperlink, choose to see additional details online through program website 1418, and make a reservation. Additionally, if CM 1306 has enrolled to receive newsletters but has not yet created customized alerts, default alerts based on information from preferences database 1514 can be sent out.

An exemplary scenario may let CM 1306 fix the time of the day when he or she receives such emails. CM 1306 can fix the size of the party (i.e., number of people accompanying him or her) for the reservation. The digest can further be customized based on a particular cuisine or geographical area that CM 1306 chooses to dine in. If there is a tie between various restaurants for a particular search criteria entered by CM 1306, CM 1306 can decide on further criteria to eliminate the tie. A sample newsletter is shown in FIG. 20A.

3.2 Example 2: "Flash" Alerts

"Flash" alerts are single offer messages delivered via communication schemes, such as, for example and not limited to, text message or email to a limited number of enrollee CMs. To obtain a benefit from "Flash" alerts, CM 1306 can select specific restaurants that he or she wishes to be alerted on if those restaurants have availability. As in the case of daily digests, CM 1306 can pre-program the maximum number of "Flash" alerts he or she receives. Restaurant 1302 can use "Flash" alerts as an opportunity to proactively push out scarce inventory in a short timeframe. Generally, the time duration for which a "Flash" alert is valid is less than that for offers posted in a daily digest. However, the invention is equally valid for any longer time duration for which a "Flash" alert might be sent.

According to one embodiment of the invention, not all eligible CMs may be sent "Flash" alerts due to limited availability of the inventory. For example, out of 90 eligible recipient CMs, only 60 CMs may be contacted for a particular "Flash" alert and the remaining 30 eligible CMs might not be contacted. Such a differentiation may be done, for example and without limitation, on the basis of a preference-matching algorithm using, for example and without limitation, cuisine, location, time of day, table size, and how frequently the customer uses the system. Further, in an exemplary embodiment, out of the 60 selected eligible CMs, a part of them may be contacted via email, SMS or any other combination of communication modes, depending upon individual communication preferences as is well known to one skilled in the art. A sample "Flash" alert is illustrated in FIG. 20B.

Other manifestations of the example portal 1400 will be apparent to one skilled in the art, after reading this specification.

The various functionalities of portal 1400 can be implemented on a website, as will be apparent to one skilled in the art. Such a website can contain, among other features, for merchant component 1402:

1. A merchant landing page;
2. A demo for the complete process in a popular tool, for example, "Flash" by Adobe Systems, Inc. of San Jose, Calif.;
3. A way to contact a website administrator;
4. A secure access to enrollment, password recovery, updating and deletion of records, management of individual accounts, management of inventory information, ability to track the movement of various transactions, authentication (e.g., user ID and password), and reporting on booked and/or unsold offers.

Similarly for customer component 1406, such a website can contain, among other things:

1. A CM landing page;
2. An ability to search for real time offers made by the merchant side 1402;
3. Facilities for enrollment, password recovery, authenticating, reviewing available offers, matching user preferences, providing a history of transactions, and for modifying any search related to the offers made by the merchant side 1402.

An administrator of an example yield management portal may be responsible for various actions involving portal 1400. For example, the administrator may be able to perform all functions that merchant component 1402 and customer component 1406 can perform including but not limited to: updating inventory on behalf of merchants, viewing merchant reports, and making reservations on behalf of CMs, changing inventory details at any time, creating CM and merchant email lists based on profile and usage criteria (e.g. tables, last active date, etc.), write and send email marketing messages to targeted audience (email list could contain one or more recipients), review, modify, and approve merchant enrollment information, assign pricing tables and verify that the merchant is indeed a restaurant merchant eligible to participate in the program (merchant account may not be activated until enrollment is approved). Merchants may have the ability to upload one or more pricing tables with discount and spread amounts and/or fees that can vary by day of the week, time of the day, cumulative tables loaded/quarter, and merchant tenure in program.

The administrator can also designate merchants to appear in a "Featured Inventory" list or have premium placement in CM search results. The administrator can access reporting including, but not limited to: CM and merchant usage statistics, reservations, top restaurants (viewed and reserved), top offers (viewed and reserved), push campaign results, and CM characteristics summary. Other roles and functions of the administrator can be understood easily by one skilled in the art.

4. Inventory Upload Process Flow

Figure 16:
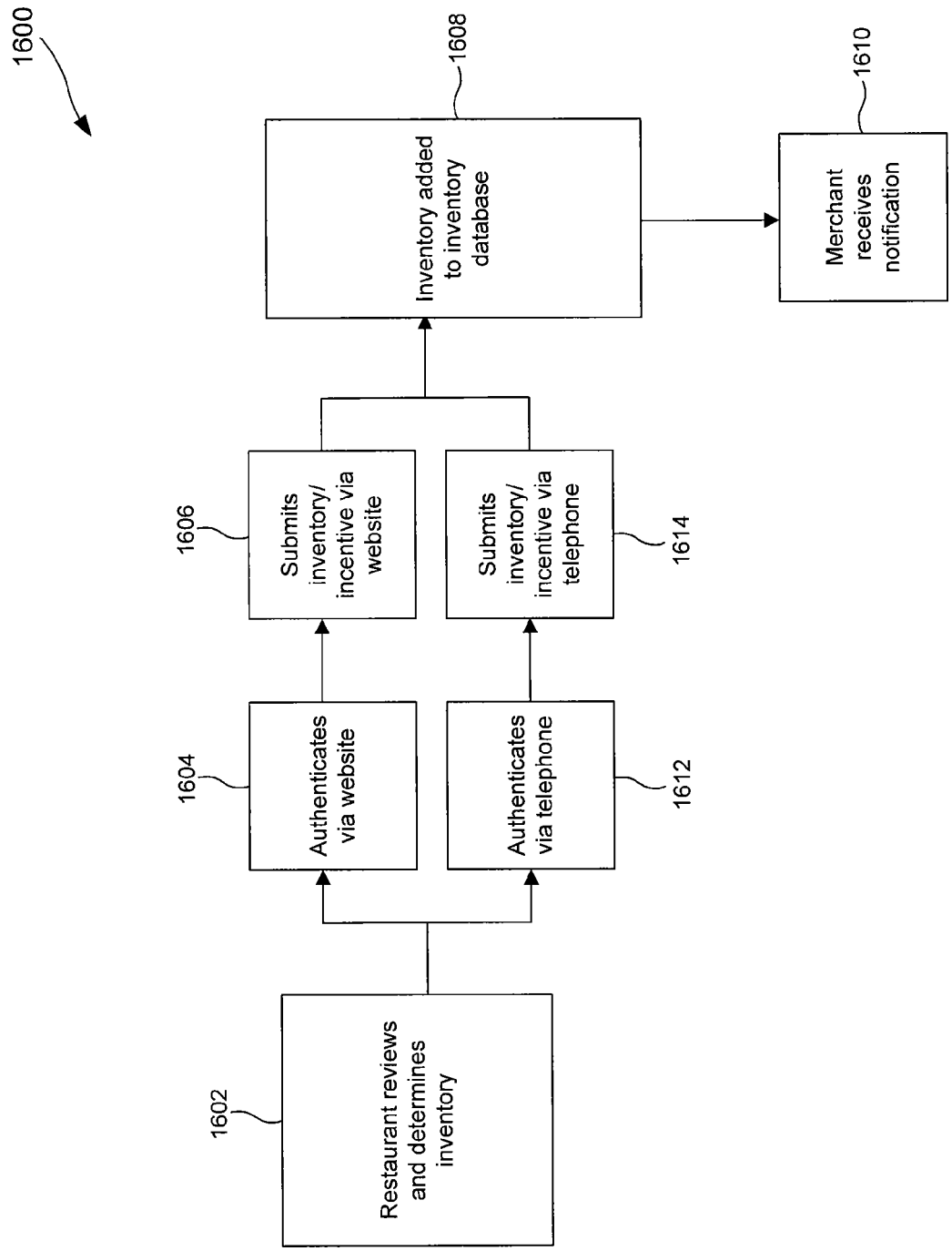
FIG. 16 illustrates a process flow for uploading inventory to an exemplary restaurant yield management portal, according to an embodiment of the present invention.

FIG. 16 illustrates an example method 1600 showing the details of how a merchant 1302 of FIG. 13 can upload the details of its inventory to a website. In step 1602, merchant 1302 reviews bookings and determines inventory (e.g., a number of available tables for an offer or incentive) to load to an exemplary restaurant yield management portal. This can be done in multiple ways. When the portal is accessed via a website, for example, merchant 1302 is authenticated via the website in step 1604. Merchant 1302 then enters inventory and/or incentives onto the website in step 1606. Method 1600 then proceeds to step 1608.

Alternatively, if the portal is accessed via telephone, merchant 1302 is authenticated via telephone in step 1612. In step 1614, the inventory and/or incentive is submitted to the portal over the telephone. Method 1600 then proceeds to step 1608.

In step 1608, the inventory is added to an inventory database of card company 1304. If a customer service representative is used, the inventory is manually entered into the system. If an IVR or website is used, the portal autopopulates the inventory into the inventory database.

In step 1610, merchant 1302 receives a notification (e.g., an "FYI" email) once the inventory is entered. The inventory may also be seen by a CM 1306 on the reservation portal website.

Certain restrictions may apply to offers listed in the portal. For example, for a given period of time prior to an available reservation, merchant 1302 may be unable to make changes to previously uploaded inventory. At a given time prior to the available reservation, inventory may begin to be marketed to CM 1306 via, for example, program website 1540, email 1538, or text messaging 1534 of FIG. 15.

Additionally at a given time prior to the available reservation, available reservations may cease to be active and may not accessible by CM 1306.

5. Reservation Process Flow

Figure 17:
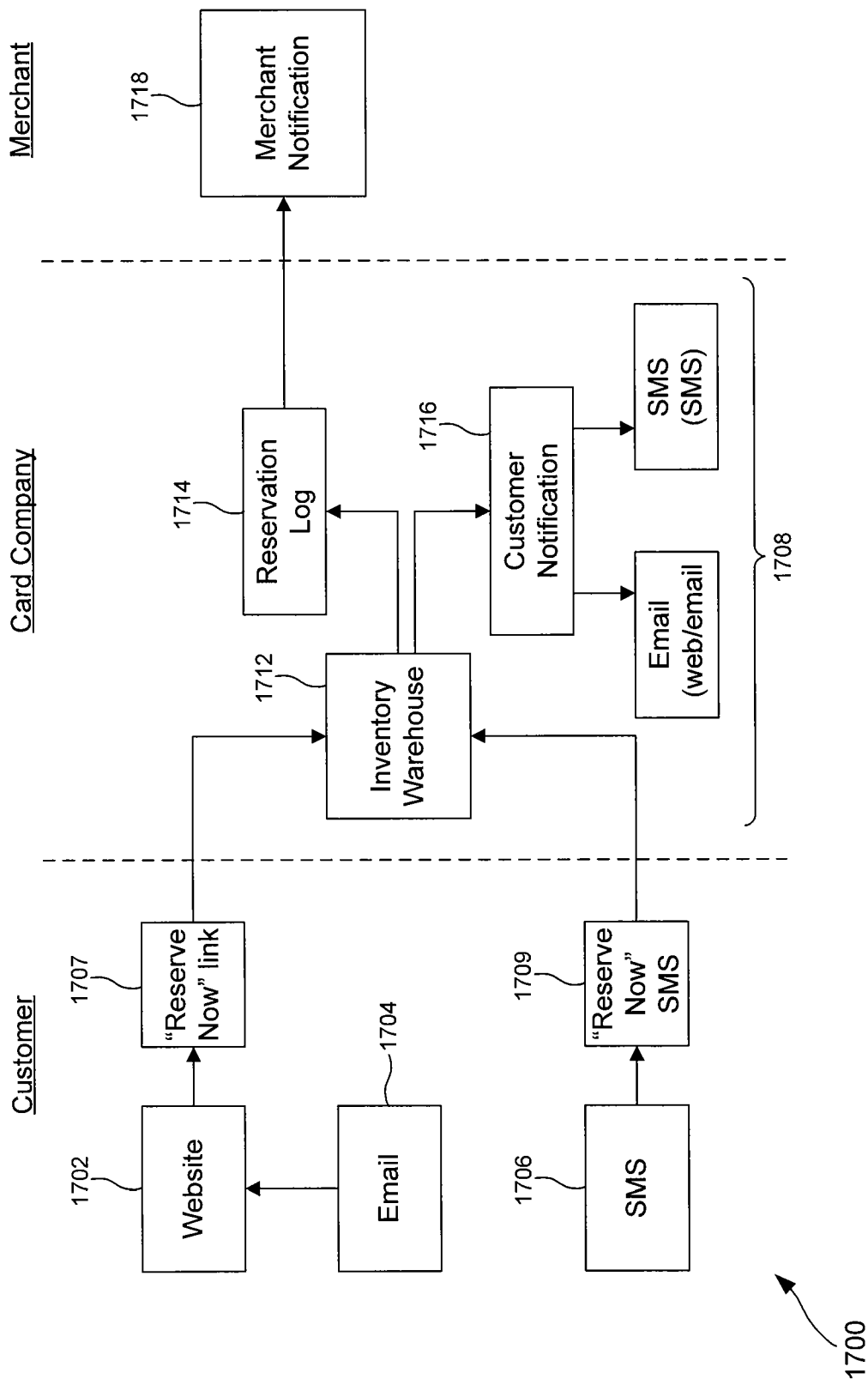
FIG. 17 illustrates a process flow for making reservations, according to an embodiment of the present invention.

FIG. 17 illustrates an example process 1700 for a reservation made by CM 1306. A customer is first notified of an offer via, for example, website 1702, email 1704, or text message 1706. If email 1704 is used for notification, email 1704 may include a link to drive the customer to website 1702. Website 1702 includes additional offer information, and a "reserve now" link 1707. Similarly, text message 1706 also provides a "reserve now" option 1709 in which CM 1306 replies with an appropriate SMS short code to trigger a reservation.

A backend system 1708 ensures that the communication from CM 1306 is appropriately handled. Backend system 1708 may include, among other things, an inventory warehouse 1712, a reservation log 1714, and a CM messaging system 1716.

Backend system 1708 also contacts the merchant regarding accepted offers/reservations via a merchant messaging system 1718.

If an email is received by CM 1306, a hyperlink will be included in the email message for sending a response. CM 1306 clicks on the hyperlink to go to a program website where he or she can make a reservation. For a text message, CM 1306 replies via a short code indicating that they wish to avail the offer and make a reservation. If the offer is still available, the table is reserved, inventory warehouse 1712 and reservation log 1714 are updated, and a reply is sent back to the CM 1306. If the offer is not still available, an alternative offer is sent via another text message.

Figure 18:
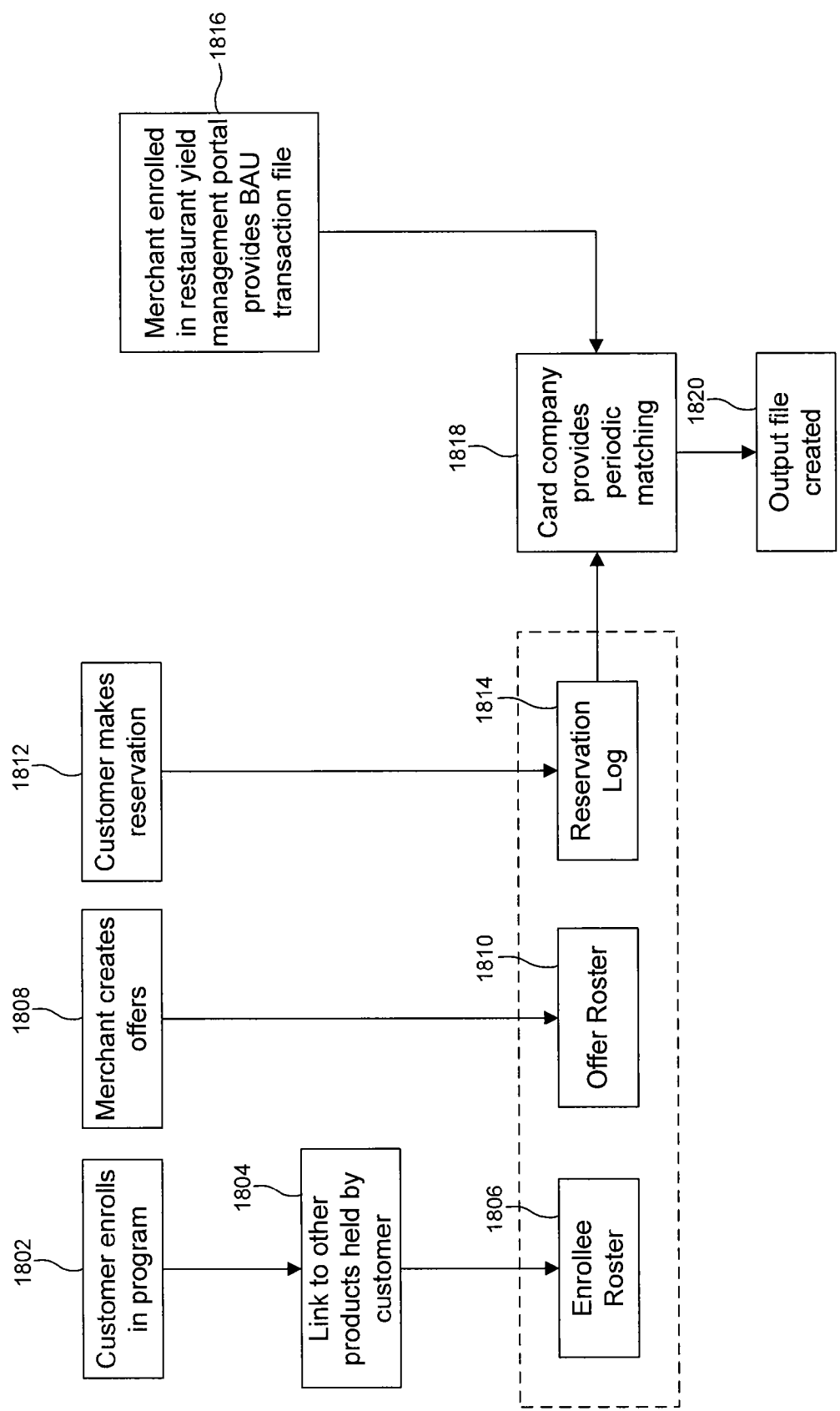
FIG. 18 shows an exemplary transaction for a restaurant yield management portal, according to yet another embodiment of the invention.

FIG. 18 illustrates the process of couponless offer fulfillment by CM 1306 and merchant 1302. In step 1802, CM 1306 enrolls in an example restaurant yield management portal. A registered identification number is usually allotted to every such CM 1306 whose enrollment is approved by card company 1304. Post approval of CM 1306, card company 1304 links all products issued by card company 1304 to CM 1306 in step 1804. Based on the enrollment in step 1802 and the linking in step 1804, card company 1304 creates an enrollee roster in step 1806 containing all eligible card members by enrolled card members.

In step 1808, merchant 1302 creates and submits offers for CM 1306. In step 1810, card company 1304 uses these offers to compile an offer roster. The offer roster is a list of all open offers at a given time.

In step 1812, CM 1306 accepts an offer and makes a reservation. In step 1814, card company 1304 creates a reservation log. The reservation log is a cumulative list of reservations that are live at a given time. The log may be made by CM 1306 but might not yet be transacted.

Meanwhile, in step 1816, merchant 1302 continues a BAU submission of all transaction information, by means of a BAU transaction file, to card company 1304, via various communication channels well known to one skilled in the art.

In step 1818, card company 1304 sorts the BAU transaction file submitted for transaction information to identify transactions by program enrollees at eligible restaurants at eligible times where a reservation has also been made. matches the enrollee roster and the offer roster In step 1820, an output file is created based on the transaction and eligibility matching and comparing performed in step 1818. The output file contains, among other entries, CM 1306's identification number, the transaction amount, date of the transaction, merchant 1302 at which the transaction occurred and an offer identification number. This can determine the credit to be provided to CM 1306, as well as the charge to merchant 1302.

The output file is described in more detail in FIG. 19, which illustrates an example output file 1900. Debits (to merchant 1302), plus credits and sales commissions are offset in any transaction between CM 1306 and merchant 1302. Consider, for example, the case of merchant 1302 "A". CM 1306 avails a discount offer made by merchant 1302. Merchant 1302 debits CM 1306 an amount of $380.00, shown in box 1901 at the time of sale. However, CM 1306 receives, in his or her periodic statement, a credit of $76.00 (or the equivalent of value in terms of loyalty points) as shown in box 1908. As a result, the net amount paid by CM 1306 is $304.00 only. If the commission paid by merchant 1302 to card company 1304 is $38.00 (i.e., 10%) as shown in box 1902, the total amount by which the card company 1304's payment to the merchant is reduced (or invoiced) is $114.00, as shown in box 1906. Alternatively, an invoice for $114.00 can also be sent to the merchant. This procedure takes place for all such merchants 1302 and for all CMs 1306, as shown by an oval 1904. In this way, a couponless credit system is carried out between CM 1306 and merchant 1302 via card company 1304. These incentives and commissions may vary by merchant and customer.

Similar to the process of reservations, a cancellation process can also be implemented, according to various embodiments of the invention described herein.

6. Advantages of the Restaurant Yield Management Portal

Apart from the functionality details of the exemplary restaurant yield management portal that have been described above, one skilled in the art can understand the benefits of such a system and its flexibility features. Some of these advantages have been described below, as an example and not as a limitation. One skilled in the art can further modify and gain more advantages by using a combination of features described, in this section and elsewhere, according to various embodiments of the present invention.

The restaurant yield management portal serves as a real time targeted marketing platform providing both the merchant's and the CM's ability to sell and purchase perishable and non-perishable inventory in a real time environment on a periodic basis. The term "periodic" encapsulates any time duration having regularity or a period including hourly, daily, weekly, monthly or quarterly periods, depending upon the specific embodiment in which the invention is being used. Unlike many prior attempts for targeted marketing by means of providing financial incentive to the CM, the restaurant yield management portal provides a friendly GUI for the merchant component as well as the consumer component. By means of its friendly GUI, the restaurant yield management portal provides an easy-to-use online booking facility in addition to separate web, email, text message, RSS and WAP platforms for the sale of immediately available or immediately perishable inventory.

In an exemplary scenario, a merchant might know about consumer purchase behavior to show a low demand trend for a particular day of the week beforehand, say three days in advance. By means of the restaurant yield management portal, the merchant can notify a set of registered CMs about potential discounts associated with such low demand (or off-peak) inventory which would have otherwise gone un-consumed. In this scenario, a winning situation for a merchant would be to have the off-peak inventory sold to a CM who would, in a normal scenario, have consumed it during high demand period but due to an incentive decides to dine at an off-peak period instead. For example, if a restaurant owner knows that there will be heavy reservations on a Thursday night but very low reservations on a Wednesday night, he or she can market an incentive to entice a CM to dine on that Wednesday night to a CM who doesn't care about which night he dines outside. The restaurant owner can, via the restaurant yield management portal, give discount offers to that CM which can be credited during the monthly statement that the CM would receive from his card company, thereby resulting in a couponless discount offer. According to one embodiment of the invention, such a couponless rebate system is also helpful to the merchants to avoid having to train new staff and in easing logistics issues thereby resulting in cost savings.

According to one embodiment of the invention, a merchant can employ a push mechanism of marketing perishable inventory by which specific CMs can be sent information about specific perishables by means of explicit data analysis. This is different from systems that sell perishable inventory by basing their marketing strategies on an inferential model. For example, in an inferential model, if a CM buys a product X, then it is inferred that he or she might be interested in buying products Y and Z too from the same family of products as X. Accordingly, information regarding Y and Z is sent to the CM. In contrast, using restaurant yield management portal a CM explicitly states his or her preferences. For example, in case of a restaurant, the CM may specify favorite cuisines in an order and solicit information about any restaurants offering deals on those cuisines. Therefore, restaurant yield management portal provides a more accurate method of customer characterization than previous systems, though restaurant yield management portal may, too, use an inferential model to supplement the matching via explicit preferences.

According to yet another embodiment of the invention, restaurant yield management portal facilitates a dynamic inventory submission and accumulation mechanism that lists very limited time offers for a specific class of perishable inventory; however, offers can be made very specific or very general and anything in between depending upon a merchant's discretion. By coupling a real-time submission mechanism with "push" marketing via web, email or text message, the merchant can reach enrollees within a short period of time.

According to another embodiment of the current invention, the CM can sign up for enrollment to the discounts program in the restaurant yield management portal by signing up on a website corresponding to the restaurant yield management portal or the card member can refer a friend to sign up to receive discounts.

Such systems and methods may be utilized by a financial company, such as a transaction card provider, who operates a network such as network 102. These systems and methods (or any part(s) or function(s) thereof) may be implemented using hardware, software or a combination thereof, and may be implemented in one or more computer systems or other processing systems. However, the manipulations performed by the methods and systems disclosed herein were often referred to in terms, such as adding or comparing, which are commonly associated with mental operations performed by a human operator. No such capability of a human operator is necessary, or desirable in most cases, in any of the operations described herein which form part of the present invention. Rather, the operations may be machine operations. Useful machines for performing the operation of the present invention include general purpose digital computers or similar devices.

Figure 12:
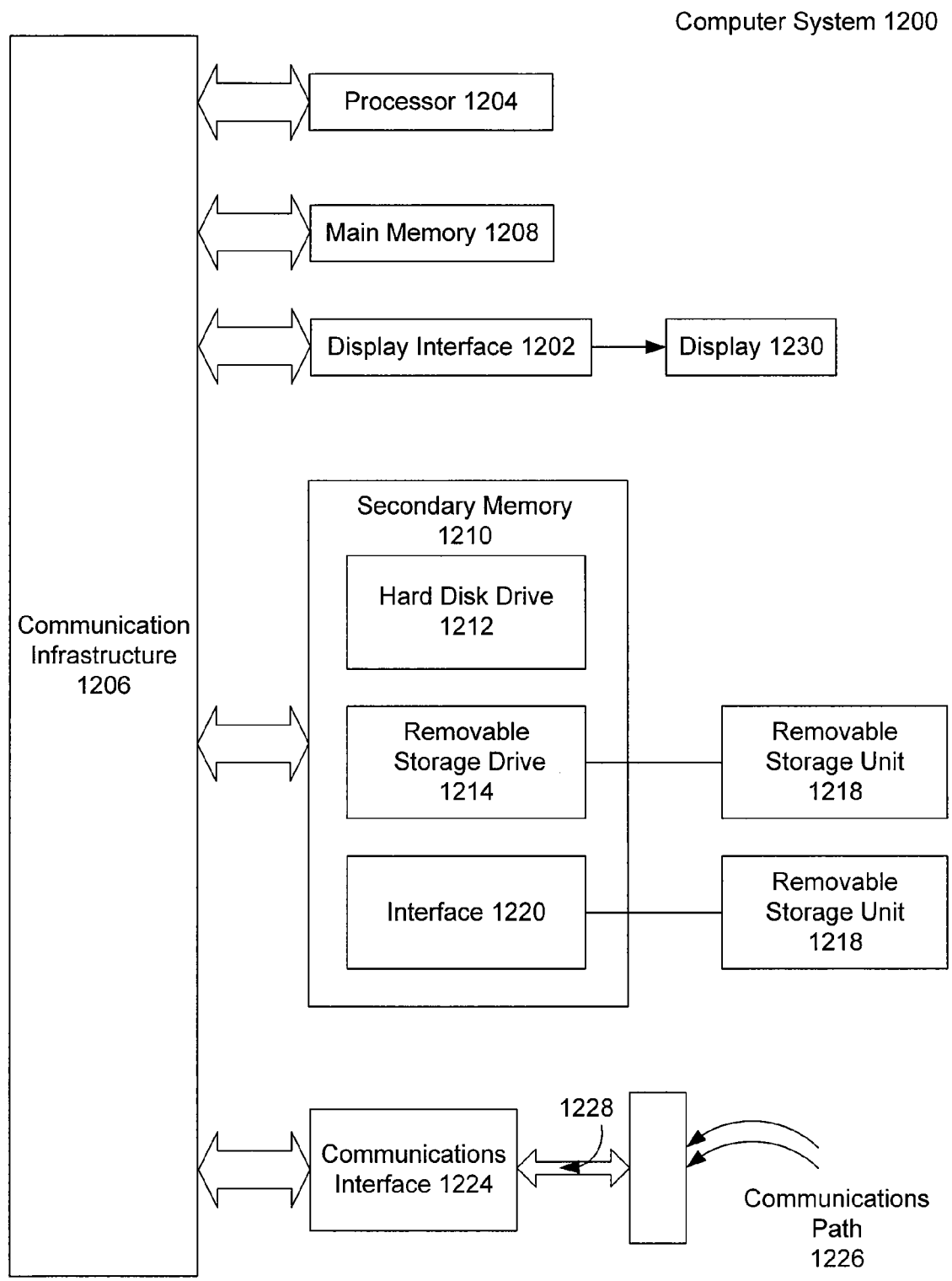
FIG. 12 is a block diagram of an exemplary computer system useful for implementing the present invention.

In fact, in one embodiment, the invention is directed toward one or more computer systems capable of carrying out the functionality described herein. An example of a computer system 1200 is shown in FIG. 12.

The computer system 1200 includes one or more processors, such as processor 1204. The processor 1204 is connected to a communication infrastructure 1206 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 1200 can include a display interface 1202 that forwards graphics, text, and other data from the communication infrastructure 1206 (or from a frame buffer not shown) for display on the display unit 1230.

Computer system 1200 also includes a main memory 1208, preferably random access memory (RAM), and may also include a secondary memory 1210. The secondary memory 1210 may include, for example, a hard disk drive 1212 and/or a removable storage drive 1214, representing a floppy disk drive, a magnetic tape drive, an optical disk drive, etc. The removable storage drive 1214 reads from and/or writes to a removable storage unit 1218 in a well known manner. Removable storage unit 1218 represents a floppy disk, magnetic tape, optical disk, etc. which is read by and written to by removable storage drive 1214. As will be appreciated, the removable storage unit 1218 includes a computer usable storage medium having stored therein computer software and/or data.

In alternative embodiments, secondary memory 1210 may include other similar devices for allowing computer programs or other instructions to be loaded into computer system 1200. Such devices may include, for example, a removable storage unit 1218 and an interface 1220. Examples of such may include a program cartridge and cartridge interface (such as that found in video game devices), a removable memory chip (such as an erasable programmable read only memory (EPROM), or programmable read only memory (PROM)) and associated socket, and other removable storage units 1218 and interfaces 1220, which allow software and data to be transferred from the removable storage unit 1218 to computer system 1200.

Computer system 1200 may also include a communications interface 1224. Communications interface 1224 allows software and data to be transferred between computer system 1200 and external devices. Examples of communications interface 1224 may include a modem, a network interface (such as an Ethernet card), a communications port, a Personal Computer Memory Card International Association (PCMCIA) slot and card, etc. Software and data transferred via communications interface 1224 may be in the form of signals 1228 which may be electronic, electromagnetic, optical or other signals capable of being received by communications interface 1224. These signals 1228 are provided to communications interface 1224 via a communications path (e.g., channel) 1226. This channel 1226 carries signals 1228 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 1214, a hard disk installed in hard disk drive 1212, and signals 1228. These computer program products provide software to computer system 1200. The invention is directed to such computer program products.

Computer programs (also referred to as computer control logic) are stored in main memory 1208 and/or secondary memory 1210. Computer programs may also be received via communications interface 1224. Such computer programs, when executed, enable the computer system 1200 to perform the features of the present invention, as discussed herein. In particular, the computer programs, when executed, enable the processor 1204 to perform the features of the present invention. Accordingly, such computer programs represent controllers of the computer system 1200.

In an embodiment where the invention is implemented using software, the software may be stored in a computer program product and loaded into computer system 1200 using removable storage drive 1214, hard drive 1212 or communications interface 1224. The control logic (software), when executed by the processor 1204, causes the processor 1204 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

III. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method for improving utilization of a perishable inventory, comprising:
   receiving, by an inventory allocation computing device, information regarding the perishable inventory of a merchant stored in a merchant inventory system, wherein the perishable inventory is identified as being within periods of low demand:
   automatically targeting, by the computing device, a consumer, wherein the targeting comprises:
      automatically receiving, by the computing device, consumer preferences data from a preferences database;
      automatically applying a first portion of the consumer preferences to the received information regarding the perishable inventory of the merchant to identify available inventory from the received perishable inventory information,
      automatically applying a second portion of the consumer preferences to the identified available inventory information and automatically forming a customized available inventory offer list, wherein the customized available inventory offer list is ranked based on the second portion of consumer preferences, and
      automatically composing, by the computing device, at least one of an email message, a text message, or a voice message to communicate the customized offer list,
      automatically communicating, by the computing device, the customized offer list to the consumer;
   receiving, by the computing device, a reservation made by the consumer of a portion of the perishable inventory from the offer list;
   notifying the merchant of the reservation by the computing device, in response to the reservation of a portion of the perishable inventory from the offer list;
   debiting, by the computing device, the consumer for a full price of goods or services associated with the reservation; and
   crediting, by the computing device, the consumer with a difference between the full price of goods or services associated with the reservation and a discounted merchant price or an equivalent value in loyalty points.

2. The method of claim 1, wherein the receiving information regarding the perishable inventory further comprises providing details of the perishable inventory to a reservations portal that is accessible by the merchant and the consumer.

3. The method of claim 2, further comprising:
   rectifying erroneous entries to the reservations portal by contacting a system administrator or a call center.

4. The method of claim 1, wherein the targeting further comprises displaying on a website at least a portion of the available inventory for the consumer.

5. The method of claim 1, further comprising facilitating real-time online, a text message, Interactive Voice Response or telephone reservation by the consumer.

6. The method of claim 1, wherein the crediting comprises:
   automatically crediting the consumer with a value of a merchant incentive; and
   billing the merchant for the value of the merchant incentive plus a sales commission via at least one of a reservations portal, an electronic mail communication, a telephonic message communication, or a paper statement.

7. The method of claim 1, wherein the targeting further comprises updating an availability of the offer list until one hour prior to a time at which an offer in the offer list must be accepted, wherein offer acceptance takes place at a reservations portal.

8. The method of claim 1, further comprising:
   registering the consumer by linking a credit card account with a reservations portal such that a transaction card company hosting the reservations portal receives a commission from the merchant for every purchase made by the consumer.

9. The method of claim 1, wherein the receiving information regarding the perishable inventory further comprises:
   authenticating by a telephone or a website, the merchant associated with the perishable inventory; and notifying the merchant of a sale of a portion of the perishable inventory.

10. The method of claim 1, wherein a number of offers in the offer list depends on a capacity of a communication channel of the offer list comprising at least one of the email message, the text message, or the voice message.

11. A method comprising:
   hosting, by an inventory allocation computing device, information on a reservations portal that can be accessed by merchants and card members;
   providing, by the computing device, a list of customized off-peak incentives to a card member, in response to a pre-selected stored delivery trigger, wherein the providing comprises:
      receiving, by the computing device, at an inventory allocation engine, card member preferences data from a preferences database, wherein the preferences database is stored in a tangible computer usable medium;
      applying, by the computing device, a first portion of the card member preferences to identify available merchant inventory from a perishable inventory of a merchant, wherein the perishable merchant inventory information is stored in a merchant inventory submission and maintenance system wherein the perishable inventory of the merchant is identified as being within periods of low demand,
      applying, by the computing device, a second portion of the card member preferences to the identified available merchant inventory information and automatically forming the list of customized off-peak incentives, wherein the customized off-peak incentives are ranked based on the second portion of card member preferences, and
      delivering, by the computing device, at least one of an email message, a text message, or a voice message to communicate the list of off-peak incentives;
   receiving, by the computing device, a reservation with a particular merchant based on a selected off-peak incentive provided by the particular merchant;
   billing, by the computing device, the card member for a full amount of a transaction at the particular merchant; and
   crediting, by the computing device, the card member with either a portion of the full amount of the transaction or an equivalent amount in loyalty points.

12. The method of claim 11, wherein the hosting further comprises:
   generating a periodic transaction statement for the merchant and the card member; and validating the perishable inventory and updates to the perishable inventory.

13. The method of claim 11, wherein the hosting further comprises:

managing accounts of the card member by updating the preferences database; and maintaining a reservation log and a cancellation log.

14. A system, comprising:

a processor;

a memory storing instructions, which when executed by the processor, cause the processor to:

provide information about restaurants having available tables that have not yet been reserved to a potential customer, wherein the provided information is compiled based on:

receiving, by an inventory allocation engine, potential customer preferences data from a preferences database;

electronically applying a first portion of the potential customer preferences to information regarding restaurant tables that are identified as being within periods of low demand to identify restaurants having the available tables;

electronically applying a second portion of the potential consumer preferences to the identified restaurant information and electronically forming a list of customized off-peak incentives ranked based on the potential customer preferences; and electronically delivering at least one of an email message, a text message, or a voice message to communicate the list of customized off-peak incentives;

accept a reservation made by the potential customer;

inform a restaurant of the reservation;

charge a full amount for goods or services associated with the reservation at a time of sale to an account associated with the potential customer; and automatically credit a potential customer statement associated with the potential customer for either a discount corresponding to the reservation or an equivalent value in loyalty points.

15. The system of claim 14, wherein the instructions, when executed by the processor, further cause the processor to authenticate the restaurant and the potential customer by validating.

16. The system of claim 14, wherein the instructions, which when executed by the processor, cause the processor to inform the restaurant of the reservation further comprise instructions to send confirmations to the restaurant and the potential customer about specific reservations or cancellations.

17. The system of claim 14, wherein the instructions, which when executed by the processor, cause the processor to provide information about the restaurants further comprise instructions to collect, from a third party, additional information related to ratings of the restaurants or driving directions to and from the restaurants.

18. The system of claim 14, wherein the instructions, which when executed by the processor, further cause the processor to:

compute a total number of communication messages to be sent to the potential customer based on a total number of available tables; and limit the total number of the communication messages to be sent per restaurant per day.

* * * * *